United States Patent
Yamada et al.

(10) Patent No.: US 6,799,151 B1
(45) Date of Patent: Sep. 28, 2004

(54) METHOD AND APPARATUS FOR PARALLEL PROCESSING

(75) Inventors: So Yamada, Nakai-machi (JP); Shinjiro Inabata, Nakai-machi (JP); Nobuaki Miyakawa, Nakai-machi (JP); Hajime Takashima, Ohmiya (JP); Kunihiro Kitamura, Ohmiya (JP); Shigeru Obara, Kushiro (JP)

(73) Assignees: Taisho Pharmaceutical Co., Ltd, Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 09/544,201

(22) Filed: Apr. 7, 2000

(30) Foreign Application Priority Data

Apr. 13, 1999 (JP) ............................................ 11-105536

(51) Int. Cl.[7] .............................. G06F 17/50; G06F 7/48
(52) U.S. Cl. ............................... 703/12; 703/11; 703/2; 708/446
(58) Field of Search ................................. 703/2, 11, 12; 702/22, 27; 708/446, 501, 523; 436/8; 712/203, 201, 28

(56) References Cited

U.S. PATENT DOCUMENTS

| | | | |
|---|---|---|---|
| 5,574,844 A | * 11/1996 | Mohanty et al. | ............ 345/803 |
| 5,604,686 A | * 2/1997 | Stewart | ........................ 703/12 |
| 5,631,469 A | * 5/1997 | Carrieri et al. | .......... 250/341.5 |
| 6,026,422 A | * 2/2000 | Yamada et al. | ............. 708/523 |
| 6,073,155 A | * 6/2000 | Inabata et al. | .............. 708/490 |
| 6,185,472 B1 | * 2/2001 | Onga et al. | ................. 700/121 |
| 6,366,873 B1 | * 4/2002 | Beardmore et al. | ........... 703/13 |
| 6,631,391 B1 | * 10/2003 | Inabata et al. | .............. 708/495 |
| 6,678,450 B1 | * 1/2004 | Franson | ....................... 385/122 |

FOREIGN PATENT DOCUMENTS

JP    A-9-50428    2/1997

OTHER PUBLICATIONS

Hashimoto et al., MOE: A Special–Purpose Parallel Computer for High–Speed, Large–Scale Molecular Orbital Calculation, Jan. 1999, ACM.*

Kandaswamy et al., Optimization and Evaluation of Hartree–Fock Application's I/O with PASSION, 1997 ACM.*

Sahoo et al., Usefulness of the Massively Parallel Processor for Study of Electronic Properties of Atomic and Condensed Matte Systems, 1988, IEEE.*

(List continued on next page.)

*Primary Examiner*—W Thomson
(74) *Attorney, Agent, or Firm*—Oliff & Berridge, PLC

(57) ABSTRACT

Matrix element calculation carried out efficiently without the overhead of communication between a host computer and processor elements even in parallel calculation utilizing a low-cost communication device and multiple processor elements having memories of a small capacity. In a method for calculating molecular orbitals, for example, all elements F(I, J) of a Fock matrix are calculated where an outermost loop is a loop associated with combinations (RT) of contracted shell R and contracted shell T which satisfy relationships $R \leq N\text{shell}$ and $T \leq R$. A second loop is a loop associated with contracted shell S, and a third loop is a loop associated with contracted shell U. Alternatively, the second loop is a loop associated with the contracted shell U, and the third loop is a loop associated with the contracted shell S. The value of S ranges from 1 to R, and the value of U ranges from 1 to R. Calculation of predetermined electron repulsion integrals and calculation of a predetermined part of Fock matrix elements utilizing the result of the calculation is carried out inside the third loop.

18 Claims, 30 Drawing Sheets

OTHER PUBLICATIONS

Hohl et al., Quantum Molecular Modeling with Simulated Annealing—A Distributed Processing and Visualization Application, 1990, IEEE.*

S. Obara et al., "*Efficient recursive computation of molecular integrals over Cartesian Gaussian functions*", J. Chem. Phys. 84 (7), Apr. 1986.

S. Shirakawa et al., "*The Architecture of a Molecular Orbital calculation Engine (MOE)*", Technical Report of IEICE, CPSY96–46 (May 1996).

I.T. Foster et al., "*Toward High–Performance Computational Chemistry: I. Scalable Fock Matrix Construction Algorithms*", Journal of computational Chemistry, vol. 17, No. 1, 1996, pp. 109–123.

* cited by examiner

FIG. 2

TRIPLE SORT ALGORITHM (COMPARATIVE EXAMPLE)

```
for(R=1;R<=Nshell;R++){
 for(S=1;S<=R;S++){
  for(T=1;T<=S;T++){
   for(U=1;U<=T;U++){
    for(I=b_basis(R);I<=e_basis(R);I++){
     for(J=b_basis(S);J<=e_basis(S);J++){
      for(K=b_basis(T);K<=e_basis(T);K++){
       for(L=b_basis(U);L<=e_basis(U);L++){
        G_IJKL=G(I,J,K,L);
        G_IKJL=G(I,K,J,L);
        G_ILJK=G(I,L,J,K);
        F[I][J]+=P[K][L] * (G_IJKL+G_IKJL+G_ILJK);
        F[I][K]-=P[J][L] * (G_IJKL+G_IKJL+G_ILJK)/2;
        F[I][L]-=P[J][K] * (G_IJKL+G_IKJL+G_ILJK)/2;
        F[J][K]-=P[I][L] * (G_IJKL+G_IKJL+G_ILJK)/2;
        F[J][L]-=P[I][K] * (G_IJKL+G_IKJL+G_ILJK)/2;
        F[K][L]+=P[I][J] * (G_IJKL+G_IKJL+G_ILJK);
}}}}
}}}}
```

FIG. 3

RT PARALLEL ALGORITHM (AN EMBODIMENT OF THE INVENTION)

```
for(RT=1;RT<=Nshell*(Nshell+1)/2;RT++){
  for(S=1;S<=R;S++){
    for(U=1;U<=R;U++){
      for(I=b_basis(R);I<=e_basis(R);I++){
        for(J=b_basis(S);J<=e_basis(S);J++){
          for(K=b_basis(T);K<=e_basis(T);K++){
            for(L=b_basis(U);L<=e_basis(U);L++){
              G_IJKL=G(I,J,K,L);
              F[I][J]+=P[K][L]*G_IJKL;
              if(L<=K&&K<I){
                if(J<I)  F[K][L]+=2*P[I][J]*G_IJKL;
                else     F[K][L]+=P[I][J]*G_IJKL;
              }
              F[I][L]-=0.5*P[K][J]*G_IJKL;
              if(J<I&&K<=J)
                F[K][J]-=0.5*P[I][L]*G_IJKL;
              if(K<I&&J<=K&&L<I)
                F[K][J]-=0.5*P[I][L]*G_IJKL;
            }}}}
  }}}
```

FIG. 6

EXAMPLE OF CUT-OFF TABLE

| CONTRACTED SHELL NUMBER X | NUMBERS OF CONTRACTED SHELLS WHICH SURVIVE CUT-OFF WHEN PAIRED WITH CONTRACTED SHELL X |
|---|---|
| 1 | 1, 2, 3, 5 |
| 2 | 2, 4 |
| 3 | 1, 3, 5 |
| 4 | 2, 3, 4, 6 |
| 5 | 1, 3, 5, 6, 7 |
| ⋮ | ⋮ |
| 100 | 87, 91, 92, 96, 97, 98, 99, 100 |

EXAMPLE OF FORMAT OF TRANSFERRED DENSITY MATRIX INFORMATION

EXAMPLE OF CONFIGURATION OF DATA BLOCK OF DENSITY MATRIX

FIG. 9

EXAMPLE OF FORMAT OF TRANSFERRED FOCK MATRIX INFORMATION

| NUMBER OF CONTRACTED SHELL R |
| --- |
| NUMBER OF CONTRACTED SHELL T |

| DATA BLOCK OF DENSITY MATRIX ASSOCIATED WITH CONTRACTED SHELL V [ 1 ] |
| --- |
| DATA BLOCK OF DENSITY MATRIX ASSOCIATED WITH CONTRACTED SHELL V [ 2 ] |

⋮

| DATA BLOCK OF DENSITY MATRIX ASSOCIATED WITH CONTRACTED SHELL V [ Nv ] |
| --- |
| DATA BLOCK OF DENSITY MATRIX ASSOCIATED WITH CONTRACTED SHELL W [ 1 ] |
| DATA BLOCK OF DENSITY MATRIX ASSOCIATED WITH CONTRACTED SHELL W [ 2 ] |

⋮

| DATA BLOCK OF DENSITY MATRIX ASSOCIATED WITH CONTRACTED SHELL W [ Nw ] |
| --- |

FIG. 10

EXAMPLE OF ASSIGNMENT OF MATRIX INFORMATION TO MEMORY

| | |
|---|---|
| 0 | NUMBER OF CONTRACTED SHELL R |
| 1 | NUMBER OF CONTRACTED SHELL T |
| 2 | NUMBER Nv OF CONTRACTED SHELL V |
| 3 | NUMBER Nw OF CONTRACTED SHELL W |
| 4 | NUMBER OF CONTRACTED SHELL V [ 1 ] |
| 5 | NUMBER OF CONTRACTED SHELL V [ 2 ] |
| ⋮ | ⋮ |
| 1003 | NUMBER OF CONTRACTED SHELL V [ Nv ] |
| 1004 | NUMBER OF CONTRACTED SHELL W [ 1 ] |
| 1005 | NUMBER OF CONTRACTED SHELL W [ 2 ] |
| ⋮ | ⋮ |
| 1503 | NUMBER OF CONTRACTED SHELL W [ Nw ] |
| | (SPACE AREA) |
| 2000 | DATA BLOCK OF DENSITY MATRIX ASSOCIATED WITH CONTRACTED SHELL V [ 1 ] |
| | DATA BLOCK OF DENSITY MATRIX ASSOCIATED WITH CONTRACTED SHELL V [ 2 ] |
| | ⋮ |
| | DATA BLOCK OF DENSITY MATRIX ASSOCIATED WITH CONTRACTED SHELL V [ Nv ] |
| | (SPACE AREA) |
| 10000 | DATA BLOCK OF DENSITY MATRIX ASSOCIATED WITH CONTRACTED SHELL W [ 1 ] |
| | DATA BLOCK OF DENSITY MATRIX ASSOCIATED WITH CONTRACTED SHELL W [ 2 ] |
| | ⋮ |
| | DATA BLOCK OF DENSITY MATRIX ASSOCIATED WITH CONTRACTED SHELL W [ Nw ] |
| | (SPACE AREA) |
| 18000 | DATA BLOCK OF FOCK MATRIX ASSOCIATED WITH CONTRACTED SHELL V [ 1 ] |
| | DATA BLOCK OF FOCK MATRIX ASSOCIATED WITH CONTRACTED SHELL V [ 2 ] |
| | ⋮ |
| | DATA BLOCK OF FOCK MATRIX ASSOCIATED WITH CONTRACTED SHELL V [ Nv ] |
| | (SPACE AREA) |
| 26000 | DATA BLOCK OF FOCK MATRIX ASSOCIATED WITH CONTRACTED SHELL W [ 1 ] |
| | DATA BLOCK OF FOCK MATRIX ASSOCIATED WITH CONTRACTED SHELL W [ 2 ] |
| | ⋮ |
| | DATA BLOCK OF FOCK MATRIX ASSOCIATED WITH CONTRACTED SHELL W [ Nw ] |

[ TABLE 1. ANGULAR MOMENTUMS, ORBITAL EXPONENTS AND NUCLEAR COORDINATES OF PRIMITIVE BASIS FUNCTIONS ]

| NUMBERS OF PRIMITIVE BASIS FUNCTIONS | ANGULAR MOMENTUM | ORBITAL EXPONENT | NUCLEAR COORDINATE |
|---|---|---|---|
| i | a | $\zeta a$ | A |
| j | b | $\zeta b$ | B |
| k | c | $\zeta c$ | C |
| l | d | $\zeta d$ | D |

FIG. 23

(EXPRESSION 1)

$$\phi_\mu = \sum_l \chi_l C_{l\mu}$$

(EXPRESSION 2)

$$\Psi(1, 2, \cdots, 2n) = \frac{1}{\sqrt{(2n)!}} \times$$

$$\begin{vmatrix} \phi_1\alpha(1) & \phi_1\beta(1) & \phi_2\alpha(1) & \phi_2\beta(1) & \cdots & \phi_n\alpha(1) & \phi_n\beta(1) \\ \phi_1\alpha(2) & \phi_1\beta(2) & \phi_2\alpha(2) & \phi_2\beta(2) & \cdots & \phi_n\alpha(2) & \phi_n\beta(2) \\ \vdots & \vdots & \vdots & \vdots & & \vdots & \vdots \\ \phi_1\alpha(2n) & \phi_1\beta(2n) & \phi_2\alpha(2n) & \phi_2\beta(2n) & \cdots & \phi_n\alpha(2n) & \phi_n\beta(2n) \end{vmatrix}$$

(EXPRESSION 3)

$$H = H_1 + H_2$$

(EXPRESSION 4)

$$H_1 = \sum_p \left( -\frac{1}{2} \nabla_p^2 - \sum_A \frac{Z_A}{r_{pA}} \right)$$

(EXPRESSION 5)

$$H_2 = \sum_p \sum_{q(>p)} \frac{1}{r_{pq}}$$

FIG. 24

(EXPRESSION 6)

$$\varepsilon = \int \Psi H \Psi \, d\tau = \int \Psi (H_1 + H_2) \Psi \, d\tau$$

$$= 2 \sum_{\mu} H_{\mu} + \sum_{\mu} \sum_{\nu} (2 J_{\mu\nu} - K_{\mu\nu})$$

(EXPRESSION 7)

$$H_{\mu} = \int \phi_{\mu}(1) \, h^{core}(1) \, \phi_{\mu}(1) \, d\tau_1$$

(EXPRESSION 8)

$$J_{\mu\nu} = \int\int \phi_{\mu}(1) \phi_{\nu}(2) \frac{1}{r_{12}} \phi_{\mu}(1) \phi_{\nu}(2) \, d\tau_1 \, d\tau_2$$

(EXPRESSION 9)

$$K_{\mu\nu} = \int\int \phi_{\mu}(1) \phi_{\nu}(2) \frac{1}{r_{12}} \phi_{\mu}(2) \phi_{\nu}(1) \, d\tau_1 \, d\tau_2$$

FIG. 25

(EXPRESSION 10)

$$\varepsilon = 2 \sum_{\mu} \left[ \sum_{I} \sum_{J} C_{I\mu} C_{J\nu} H_{IJ} \right]$$

$$+ \sum_{\mu} \sum_{\nu} \left\{ \sum_{I} \sum_{J} \sum_{K} \sum_{L} C_{I\mu} C_{J\mu} C_{K\nu} C_{L\nu} [2 G(I, J, K, L) - G(I, K, J, L)] \right\}$$

(EXPRESSION 11)

$$H_{IJ} = \int \chi_I(1) h^{core}(1) \chi_J(1) d\tau_1$$

(EXPRESSION 12)

$$h^{core}(1) = -\frac{1}{2} \nabla_1^2 - \sum_A \frac{Z_A}{r_{1A}}$$

(EXPRESSION 13)

$$G(I, J, K, L) = \int \int \chi_I(1) \chi_J(1) \frac{1}{r_{12}} \chi_K(2) \chi_L(2) d\tau_1 d\tau_2$$

FIG. 26

(EXPRESSION 14)

$$\sum_J (F_{IJ} - \varepsilon_\mu S_{IJ}) C_{J\mu} = 0$$

(EXPRESSION 15)

$$F_{IJ} = H_{IJ} + \sum_K \sum_L P_{KL} \left[ G(I, J, K, L) - \frac{1}{2} G(I, K, J, L) \right]$$

(EXPRESSION 16)

$$\varepsilon_\mu = H_\mu + \sum_\nu (2 J_{\mu\nu} - K_{\mu\nu})$$

(EXPRESSION 17)

$$S_{IJ} = \int \chi_I(1) \chi_J(1) d\tau_1$$

(EXPRESSION 18)

$$P_{KL} = 2 \sum_\nu C_{K\nu} C_{L\nu}$$

(EXPRESSION 19)

(EXPRESSION 20)

$$\chi(r, n, R) = (r_x - R_x)^{n_x}(r_y - R_y)^{n_y}(r_z - R_z)^{n_z} \times \sum_m d_m \exp\left[-\zeta_m(r-R)^2\right]$$

(EXPRESSION 21)

$$\phi(r, n, R) = (r_x - R_x)^{n_x}(r_y - R_y)^{n_y}(r_z - R_z)^{n_z} \exp\left[-\zeta(r-R)^2\right]$$

(EXPRESSION 22)

$$\sum_m d_m \exp\left[-\zeta_m(r-R)^2\right]$$

(EXPRESSION 23)

$$G(I, J, K, L) = \sum_{m1}\sum_{m2}\sum_{m3}\sum_{m4} d_{m1} d_{m2} d_{m3} d_{m4} g(i, j, k, l)$$

(EXPRESSION 24)

$$g(i, j, k, l) = \int\int \phi_i(1)\phi_j(1)\frac{1}{r_{12}}\phi_k(2)\phi_l(2) d\tau_1 d\tau_2$$

(EXPRESSION 25)

(EXPRESSION 26)

$$[0_a 0_b, 0_c 0_d]^{(m)} = \frac{1}{\sqrt{\zeta + \eta}} \cdot K(\zeta_a, \zeta_b, A, B) \cdot K(\zeta_c, \zeta_d, C, D) \cdot F_m(T)$$

(EXPRESSION 27)

$$F_m(T) = \int t^{2m} \exp(-T t^2) dt$$

(EXPRESSION 28)

$$T = \rho (P - Q)^2$$

(EXPRESSION 29)

$$K(\zeta, \zeta', R, R') = \sqrt{2} \frac{\pi^{5/4}}{\zeta + \zeta'} \exp\left[-\frac{\zeta \zeta' (R - R')^2}{\zeta + \zeta'}\right]$$

(EXPRESSION 30)

$$\zeta = \zeta_a + \zeta_b$$

(EXPRESSION 31)

$$\eta = \zeta_c + \zeta_d$$

(EXPRESSION 32)

$$\rho = \frac{\zeta \eta}{\zeta + \eta}$$

(EXPRESSION 33)

$$P = \frac{\zeta_a A + \zeta_b B}{\zeta_a + \zeta_b}$$

(EXPRESSION 34)

$$Q = \frac{\zeta_c C + \zeta_d D}{\zeta_c + \zeta_d}$$

FIG. 29

(EXPRESSION 35)

$$[(a+1_i)b, cd]^{(m)}$$
$$= (P_j - A_i)[ab, cd]^{(m)} + (W_j - P_j)[ab, cd]^{(m+1)}$$
$$+ \frac{N_i(a)}{2\zeta}\left\{[(a-1_i)b, cd]^{(m)} - \frac{\rho}{\zeta}[(a-1_i)b, cd]^{(m+1)}\right\}$$
$$+ \frac{N_i(b)}{2\zeta}\left\{[a(b-1_i), cd]^{(m)} - \frac{\rho}{\zeta}[a(b-1_i), cd]^{(m+1)}\right\}$$
$$+ \frac{N_i(c)}{2(\zeta+\eta)}[ab, (c-1_i)d]^{(m+1)}$$
$$+ \frac{N_i(d)}{2(\zeta+\eta)}[ab, c(d-1_i)]^{(m+1)}$$

(EXPRESSION 36)

$$W = \frac{\zeta P + \eta Q}{\zeta + \eta}$$

(EXPRESSION 37)

$$exp = \left[-\frac{\zeta \zeta' (R-R')^2}{\zeta + \zeta'}\right]$$

FIG. 30

(EXPRESSION 38)

$$I \geq J, K \geq L, (IJ) \geq (KL)$$

$$(IJ) = \frac{I(I-1)}{2} + J, (KL) = \frac{K(K-1)}{2} + L$$

(EXPRESSION 39)

$$F_{IJ} += P_{KL}G(I,J,K,L),$$

$$F_{IK} += -\frac{1}{2} P_{JL}G(I,J,K,L),$$

$$F_{IL} += -\frac{1}{2} P_{JK}G(I,J,K,L),$$

$$F_{JK} += -\frac{1}{2} P_{IL}G(I,J,K,L),$$

$$F_{JL} += -\frac{1}{2} P_{IK}G(I,J,K,L),$$

(EXPRESSION 40)

$$I \geq J \geq K \geq L$$

(EXPRESSION 41)

$$F_{IJ} += P_{KL} [G(I,J,K,L)+G(I,K,J,L)+G(I,L,J,K)],$$
$$F_{IK} -= P_{JL} [G(I,J,K,L)+G(I,K,J,L)+G(I,L,J,K)]/2,$$
$$F_{IL} -= P_{JK} [G(I,J,K,L)+G(I,K,J,L)+G(I,L,J,K)]/2,$$
$$F_{JK} -= P_{IL} [G(I,J,K,L)+G(I,K,J,L)+G(I,L,J,K)]/2,$$
$$F_{JL} -= P_{IK} [G(I,J,K,L)+G(I,K,J,L)+G(I,L,J,K)]/2,$$
$$F_{KL} += P_{IJ} [G(I,J,K,L)+G(I,K,J,L)+G(I,L,J,K)]$$

(EXPRESSION 42)

$$I_B \geq J_B \geq K_B \geq L_B$$

(EXPRESSION 43)

$$I_B \geq J_B, K_B \geq L_B, (I_B J_B) \geq (K_B L_B)$$

FIG. 32

(EXPRESSION 44)

$$\frac{2(2I_C^2 + K_B I_C^2) \times 64 \times M}{T_{eri} \times \alpha^2 K_B I_C^4} = \frac{(2+K_B) \times 128M}{T_{eri} \alpha^2 K_B I_C^2} \quad (Mbps)$$

(EXPRESSION 45)

$$\frac{2(2I_C^2 + K_B I_C^2) \times 64 \times M}{T_{eri} \times 3\alpha^2 K_B I_C^4} = \frac{(2+K_B) \times 128M}{3T_{eri} \alpha^2 K_B I_C^2} \quad (Mbps)$$

(EXPRESSION 46)

$$\frac{8\alpha a^3 R \times 64 \times M}{T_{eri} \times \alpha^2 a^4 R^2} = \frac{512M}{T_{eri} \alpha a R} \quad (Mbps)$$

(EXPRESSION 47)

$$\exp\left[-\frac{\zeta_A \zeta_B (A-B)^2}{\zeta_A + \zeta_B}\right] < 10^{-15}$$

(EXPRESSION 48)

$$(RT) = \frac{R(R-1)}{2} + T$$

METHOD AND APPARATUS FOR PARALLEL PROCESSING

BACKGROUND OF THE INVENTION

1. Field of the Invention

The present invention relates to a method and apparatus for parallel processing preferably used for calculation of massive matrix elements having certain symmetry and, more particularly, for processing calculation of Fock matrix elements at a high speed during simulation of a molecule using the ab initio molecular orbital method.

2. Description of the Related Art

Techniques for numerical analysis of the state and behavior of molecules in the field of chemistry include the molecular orbital method, molecular dynamics method and Monte Carlo method. Among such methods, ab initio molecular orbital calculation are quantum-mechanical calculations based on the first principle which are aimed at describing the behavior of electrons in a molecule. Therefore, this method is regarded as a basis for simulation of a molecule and is a technique of importance from the industrial point of view which is used for close analysis of structures of substances and chemical reactions.

According to the ab initio molecular orbital calculation, a basis function is the inverse of an exponential function whose exponent is obtained by multiplying an empirical coefficient by the square of the distance between the atomic nucleus of an atom forming a part of a molecule and an orbital electron or linear combination of them, and a plurality of such basis functions are prepared for one atom. A wave function of an orbital electron in a molecule, i.e., a molecular orbital is described by linearly combining those basis functions.

A primary process of the ab initio molecular orbital calculation is to determine linear combination coefficients for the basis functions of molecular orbitals, and the calculation necessitates computational complexity and storage capacity proportion to the biquadratic of the number of the basis functions. For this reason, ab initio molecular orbital calculations are only used for molecular systems on the scale of 100 atoms or so at present. In order to realize more practical analysis of biological and chemical phenomena from the viewpoint of molecular theory, it is essential to develop a calculation system dedicated to ab initio molecular orbital calculations which is applicable even to molecular systems on the order of several thousand of atoms.

[Summary of Ab initio Molecular Orbital Calculation]

In the ab initio molecular orbital calculation, a state of a molecule $\psi$ is described using an electron orbital $\phi_\mu$ which corresponds to a spatial orbital of an electron in the molecule. Here, $\mu$ is a suffix which indicates a $\mu$-th orbital among plural molecular orbitals. A molecular orbital $\phi_\mu$ is a linear combination of atomic orbitals $\chi_I$ which is approximated by Expression 1 in FIG. 23.

In Expression 1, I is a suffix which indicates an I-th atomic orbital among plural atomic orbitals. An atomic orbital is also referred to as "basis function". In this specification, an atomic orbital is hereinafter referred to as "basis function". $C_{I\mu}$ in Expression 1 is a linear combination coefficient. The sum regarding I in Expression 1 is related to all basis functions that form a molecule to be calculated.

In order to describe molecular orbitals on a quantum mechanical basis, the states of electrons in the molecule must satisfy the well known Pauli exclusion principle. A Slater determinant like Expression 2 in FIG. 23 is used as an expression to describe a state $\psi$ of the molecule with 2n electrons such that it satisfy the Pauli exclusion principle taking electron spins into consideration. $\alpha(x)$ and $\beta(x)$ in Expression 2 respectively represent states in which an x-th electron spin is upward and downward.

The Hamiltonian H for the molecule with 2n electrons is in the form of the sum of a one-electron part $H_1$ and two-electron part $H_2$ and is expressed by Expressions 3 through 5.

The first term in the parenthesis on the right side of Expression 4 in FIG. 23 represents a kinetic energy of electrons p, and the second term represents an interaction between a p-th electron and an A-th atomic nucleus. In Expression 4, $\Sigma_p$ ($\Sigma_i$ represents sum regarding i throughout the present specification) represents the sum of all electrons; $\Sigma_A$ represents the sum of all atomic nuclei; $Z_A$ represents the charge of an atomic nucleus A; and $r_{pA}$ represents the distance between an electron p and the atomic nucleus A.

Expression 5 represents an interaction between electrons p and q. $\Sigma_p \Sigma_{q(>p)}$ represents a sum of combinations of two electrons; and $r_{pq}$ represents the distance between electrons p and q.

By using the above-described Hamiltonian H and the Slater determinant in Expression 2, an expected value $\epsilon$ of a molecular energy is expressed by Expressions 6 through 9 in FIG. 24.

In Expression 6, $\Sigma_\mu$ and $\Sigma_\nu$ represent a sum regarding n (n is a positive integer) molecular orbitals. Expression 7 is referred to as "core integral" and describes a typical electron which is numbered "1". Expressions 8 and 9 are respectively referred to as "Coulomb integral" and "exchange integral" and describe typical electrons 1 and 2.

Expression 6 can be changed using basis functions into Expressions 10 through 13 shown in FIG. 25. The integral expressed by Expression 13 is referred to as "electron-electron repulsion integral" or simply "electron repulsion integral".

An expected value $\epsilon$ of a molecular energy expressed by Expression 10 includes unknown coefficients $C_{I\mu}$, and no numerical value is obtained as it is. $C_{I\mu}$ correspond to the linear combination coefficients in Expression 1, where $\mu$ represents integers 1 through n (the number of molecular orbitals); I represents integers 1 through N (N is the number of basis functions which is a positive integer). Hereinafter, an N×n matrix C whose elements are $C_{I\mu}$ is referred to as "coefficient matrix".

One method used to determine a coefficient matrix that minimizes the expected value $\epsilon$ to obtain a wave function $\psi$ in a ground state is the Hartree-Fock-Roothaan variational method (hereinafter referred to as "HFR method". Expressions 14 through 18 in FIG. 26 are Expressions obtained by the HFR method, although the process of derivation is omitted.

$F_{IJ}$ and $P_{KL}$ are respectively referred to as "Fock matrix elements" and "density matrix elements". In the following description, those elements are sometimes expressed by F(I, J) and P(K, L). They have numerical values corresponding to I and J or K and L which are integers 1 through N, and are each expressed in the form of an N×N matrix.

A coefficient matrix is obtained by solving Expression 14. Expression 14 is a system of n×N expressions because it applies to all $\mu$'s from 1 through n and all I's from 1 through N.

A density matrix P is used to calculate a coefficient matrix C obtained by solving Expression 14. A density matrix P is calculated from a coefficient matrix C as indicated by Expression 18. Referring to the calculation procedure specifically, an appropriate coefficient matrix C is initially provided; a Fock matrix F is calculated from Expression 15 using a density matrix P calculated using the same; and a new coefficient matrix C is obtained by solving the simultaneous equations of Expression 14. The above-described calculations are iterated until the difference between the primitive coefficient matrix C from which the density matrix P is obtained and the resultant coefficient matrix C becomes sufficiently small, i.e., until it becomes self-consistent. Such iterative calculations are referred to as "self-consistent field calculation" (hereinafter abbreviated to read as "SCF calculation").

The most time-consuming calculation in practice is the calculation of Fock matrix elements $F_{IJ}$ of Expression 15. The reason is that Expression 15 must be calculated for each combination of I and J and that the sum regarding K and L of the density matrix elements $P_{KL}$ must be calculated for each combination of I and J.

There are two methods for SCF calculations. One is a method referred to as "disk storage SCF method" in which the values of all electron repulsion integrals obtained by a first SCF calculation are stored in a disk and in which required electron repulsion integrals are fetched from the disk to be used in a second and subsequent calculations. The other is a method referred to as "direct SCF method" in which calculations of electron repulsion integrals are redone each time an SCF calculation is carried out.

In present, the direct SCF method has become the main stream for reasons including limitations on disk capacities and the length of access time. When molecular orbitals are calculated using the direct SCF method, electron repulsion integrals in a quantity substantially proportionate to $N^4$ must be calculated for each SCF calculation. Therefore, an increase in the speed of the calculation of electron repulsion integrals directly results in an increase in the speed of molecular orbital calculations.

Symmetry of electron repulsion integrals G(I, J, K, L), a density matrix P(K, L) and a Fock matrix F(I, J) will now be briefly described.

As apparent from Expression 13, electron repulsion integrals have symmetry as shown in Expression 19 in FIG. 26. Therefore, if a numerical value is obtained for one integral in Expression 19, numerical values are obtained for the other seven integrals.

Expression 18 in FIG. 26 indicates that P(K, L)=P(L, K), and Expression 15 in FIG. 26 and Expression 11 in FIG. 25 indicate that F(I, J)=F(J, I).

[Contracted Basis Function and Primitive Basis Function]

In general, basis functions as shown in Expression 20 in FIG. 27 are used in ab initio molecular orbital methods. In Expression 20, r, n and R represent vectors whose components are indicated by suffixes x, y and z. r represents the coordinate of an electron; n represents an angular momentum of an electron; and R represents the coordinate of an atomic nucleus.

$n_x+n_y+n_z=\lambda$ represents the magnitude of an angular momentum which is also referred to as "orbital quantum number". An orbital is referred to as "s-orbital" if its orbital quantum number $\lambda$ is 0, as "p-orbital" if the number $\lambda$ is 1 and as "d-orbital" if the number $\lambda$ is 2.

$\zeta_m$ represents an orbital exponent which indicates spatial expansion of orbitals. One basis function may be represented by a linear combination of plural orbitals having different orbital exponents. A basis function represented in such a manner is referred to as "contracted basis function, and a linear combination coefficient $d_m$ is referred to as "contraction coefficient". An function $\phi$ in the form of Expression 21 in FIG. 27 which has not been subjected to linear combination yet is referred to as "primitive basis function".

It is a common practice to number contracted basis functions $\chi$ with capitals such as I, J, K, and L, and to number primitive basis functions $\phi$ with small letters i, j, k and l, and the present specification follows the same.

[Contracted Shells and Primitive Shells]

When the orbital quantum number is 1, three contracted basis functions, i.e., n=(1, 0, 0), n=(0, 1, 0) and n=(0, 0, 1) exist. Similarly, when the orbital quantum number is 2, six or five contracted basis functions exist depending on how to configure the basis functions.

A set of plural contracted basis functions which share a common part in Expression 20 as shown in Expression 22 of FIG. 27 is referred to as "contracted shell". A contracted shell in a p-orbital is constituted by three contracted basis functions, and a contracted shell in a d-orbital is constituted by six (or five) contracted basis functions. For simplicity, one set of contracted basis functions in an s-orbit is also referred to as "contracted shell".

A set of primitive basis functions which share the part of "$\exp[-\zeta(r-R)^2]$" in Expression 21 is similarly referred to as "primitive shell". It is a common practice to number contracted shells with capitals such as R, S, T and U and to number primitive shells with small letters such as r, s, t and u, and the present specification follows the same.

When molecular orbital calculations are carried out, plural contracted shells having different orbital quantum numbers are prepared for each atom that forms a part of the molecule to be calculated, and a collection of all of such shells is used as a set of basis functions. One contracted shell can be represented by a combination (R, $\lambda$) of a nuclear coordinate R and an orbital quantum number $\lambda$.

[Expression of Electron Repulsion Integral]

An electron repulsion integral G(I, J, K, L) expressed by contracted basis functions is expressed as shown in Expression 23 in FIG. 27 when the primitive basis functions are used. g(i, j, k, l) can be expressed as in Expression 24 in FIG. 27.

While G(I, J, K, L) is referred to as "electron repulsion integral represented by contracted basis functions" and g(i, j, k, l) is referred to as "electron repulsion integral represented by primitive basis functions", both of them may be simply referred to as "electron repulsion integral" in the following description. g(i, j, k, l) is also symmetrical as indicated by Expression 25 in FIG. 27.

A premitive basis function $\phi$ can be uniquely represented by a combination of an angular momentum n, an orbital exponent $\zeta$ and a nuclear coordinate R. It is assumed here that i-th, j-th, k-th and l-th primitive basis functions have angular momenta, orbital exponents and nuclear coordinates shown in Table 1 of FIG. 19.

For simplicity, an electron repulsion integral is expressed by, for example, [ab, cd] in which angular momenta a, b, c and d stand for the numbers i, j, k and l for primitive basis functions.

An efficient method for calculating an electron repulsion integral using a set of basis functions prepared as described above will now be described with reference to an article 1 by S. Obara and A. Saika, "Efficient recursive computation of molecular integrals over Cartesian Gaussian functions", JCP, Vol. 84, No. 7, p. 3964, 1986.

First, let us assume that all of the angular momenta a, b, c and d are the s-orbital, i.e., $a=0_a=(0, 0, 0)$; $b=_b=(0, 0, 0)$; $c=0_c=(0, 0, 0)$; and $d=0_d=(0, 0, 0)$. Then, the electron repulsion integral of Expression 24 is calculated as expressed by Expressions 26 through 34 in FIG. 28.

In Expression 26, $[.., ..]^{(m)}$ is an auxiliary integral, and m is an auxiliary index, which will be described later. The range of integration of Expression 27 is from 0 to 1.

If any of a, b, c and d is an orbital other than the s-orbital, the calculation is carried out using the recurrence formulae shown in Expressions 35 and 36 in FIG. 29.

The suffix i in Expression 35 indicates an x-, y- or z-component. $1_i$ represents a vector in which only the i-component is 1 and the other components are 0. $N_i(n)$ represents the value of an i-component of an angular momentum n. Expression 35 is characterized in that one of angular momenta seen in the auxiliary integral on the left-hand side always decreases on the right-hand side by 1 or more and in that the auxiliary index of the auxiliary integral on the left-hand side remains the same or increases by 1 on the right-hand side.

The auxiliary integral $[.., ..]^{(m)}$ exactly coincides with an electron repulsion integral $[.., ..]$ when the auxiliary index m is 0 and supports calculation of an electron repulsion integral $[.., ..]$. An auxiliary integral whose angular momenta are all (0, 0, 0) can be finally obtained by applying Expression 35 to reduce the angular momenta of an electron repulsion integral repeatedly, however angular momenta of the basis functions included in the electron repulsion integral are large. Since the auxiliary integral whose angular momenta are all (0, 0, 0) can be calculated using Expression 26, the value of the electron repulsion integral can be obtained by multiplying those values by appropriate coefficients and by adding the products.

In practice, the calculation is carried out as follows.

First, an electron repulsion integral is expressed in a form utilizing eight or less auxiliary integrals according to Expression 35. Expression 35 is further applied to the resultant auxiliary integrals. The sequence to reach auxiliary integrals whose angular momenta are all (0, 0, 0) by repeating such a procedure is recorded as a calculation procedure.

Next, Expression 26 is used to calculate auxiliary integrals whose angular momenta are all (0, 0, 0). Then, the above-described calculation procedure is carried out to calculate the numerical values of the auxiliary integrals, and a desired electron repulsion integral is finally obtained.

Another important characteristic of Expression 35 is that the same calculation procedure as described above can be used to any electron repulsion integral as long as it has the same combination of four angular momenta even if the orbital exponents and nuclear coordinates are combined differently. When the calculation is carried out, it is only required to change the coefficients by which the auxiliary integrals are multiplied depending on the orbital exponents and nuclear coordinates.

[Cut-off]

As described above, the number of electron repulsion integrals represented by contracted basis functions to be calculated is $N^4$ where N represents the number of the contracted basis functions. In practice, numerical values must be obtained for electron repulsion integrals which are presented by primitive basis functions, the total number of which ranges from several times to several tens times the number of electron repulsion integrals represented by contracted basis functions (depending on the number of the primitive basis functions which constitute the contracted basis functions, i.e., the number of contractions).

A first possible method for reducing the number is to take advantage of symmetry as seen in Expression 19 or 25. However, this method can reduce the amount of calculations of electron repulsion integrals only by a factor of eight even when the highest efficiency is achieved.

Another method is to actively eliminate calculations for electron repulsion integrals which can be regarded unnecessary from the viewpoint of computational accuracy. Such unnecessary electron repulsion integrals can be determined as follows.

As described above, the numerical values of all electron repulsion integrals are calculated based on the numerical values of auxiliary integrals $[00, 00]^{(m)}$ whose angular momenta are all (0, 0, 0) as shown in Expression 26. It is therefore possible to determine from the numerical values of $[00, 00]^{(m)}$ whether the contribution of the numerical value of an electron repulsion integral to the numerical values of Fock matrix elements is at a degree within a computational tolerance. Further, the magnitude of the numerical values of $[00, 00]^{(m)}$ can be determined from the value of the function $K(\zeta, \zeta', R, R')$ shown in Expression 29 which can be in turn determined from the magnitude of Expression 37 in FIG. 29.

It is therefore possible to determine whether it is necessary to calculate electron repulsion integrals [ab, ] by estimating the magnitude of the first function K in Expression 25 from a combination of numerical values ($\zeta_a$, A, $\zeta_b$, B). It is also possible to determine whether it is necessary to calculate electron repulsion integrals [, cd] by estimating the magnitude of the second function K in Expression 26 from a combination of numerical values ($\zeta_c$, C, $\zeta_d$, D).

Such elimination of calculations for unnecessary electron repulsion integrals is referred to "cut-off". In the above example, a cut-off performed based on determination of only information of a and b may be referred to as "ab-based cut-off", and a cut-off performed based on determination of only information of c and d may be referred to as "cd-based cut-off". Whether to perform ab- or cd-based cut-off can be determined because Expression 37 in FIG. 29 has a maximum value of 1 and a lower limit value of 0. Cut-off in such a manner reduces the number of electron repulsion integrals to be calculated to a value substantially proportionate to $N^2$, which makes it possible to reduce the amount of calculations significantly.

The above description indicates that the effect of reducing the amount of calculations based on cut-off is incomparably greater than the effect achievable using symmetry of electron repulsion integrals when the number N is great. By taking advantage of this fact, the processing time of Fock matrix calculations in the ab initio calculation of molecular orbitals can be significantly reduced.

[Example of Molecular Orbital Calculation System]

An example of a system for calculating Fock matrix elements at a high speed using parallel computers is disclosed in an article 2 (Shirakawa et al., "The Architecture of a Molecular Orbital calculation Engine (MOE)", IEICE Technical Report, Vol. CPSY96-46, No. 5, pp. 45–50, 1996).

The article 2 discloses a system in which plural processor elements are connected to a host computer through a bus to perform parallel processing. In the course of examination of an architecture of a parallel processing system having such a configuration, a total amount of calculation and a memory capacity required for processor elements were estimated for various methods employed for routing a quadruple loop formed by four indices R, S, T and U and employed for a part which implements parallel processing.

Each of the processor elements of the parallel processing system disclosed in the article 2 has a high arithmetic capability, and the entire system can be provided at a low cost. It is therefore possible to provide a computer system having high cost performance. However, the article 2 has made no mention to methods that take the above-described cut-off into account and a specific methods for controlling the loop, and a question therefore remains as to whether efficient processing is possible or not.

[Method of I. Foster et al.]

Algorithm to efficiently calculate Fock matrix elements using a parallel computer is disclosed in an article 3 (I. T. Foster, et al., "Toward High-Performance Computational Chemistry: I. Scalable Fock Matrix Construction Algorithms", Journal of Computational Chemistry, Vol. 17, No. 1, pp. 109–123, 1996).

In the article 3, analysis has been made on the amount of calculation for several kinds of algorithm for calculating Fock matrix elements and on the amount of communication between a host computer and plural processor elements. The details of the analysis will be described below.

First algorithm is the simplest algorithm referred to as "canonical ordering method". In the method, four contracted basis functions I, J, K and L and six density matrix elements $P_{IJ}$, $P_{IK}$, $P_{IL}$, $P_{JK}$, $P_{JL}$ and $P_{KL}$ which satisfy Expression 38 shown in FIG. 30 are passed to one processor element which is caused to calculate electron repulsion integrals and a part of Fock matrix elements $F_{IJ}$, $F_{IK}$, $F_{IL}$, $F_{JK}$, $F_{JL}$ and $F_{KL}$ according to Expression 39 in FIG. 30.

Let us assume that the number of matrix elements communicated between the host computer and processor element during the calculation of one electron repulsion integral is counted using a unit "perERI". Then, the number of communicated items of data is 12[perERI].

Second algorithm is algorithm referred to as "triple sort method". Four contracted basis functions I, J, K and L and six density matrix elements $P_{IJ}$, $P_{IK}$, $P_{IL}$, $P_{JK}$, $P_{JL}$ and $P_{KL}$ which satisfy Expression 40 shown in FIG. 31 are passed to one processor element which is caused to calculate three electron repulsion integrals G(I, J, K, L), G(I, K, J, L) and G(I, L, J, K) and a part of Fock matrix elements $F_{IJ}$, $F_{IK}$, $F_{IL}$, $F_{JK}$, $F_{JL}$, and $F_{KL}$ according to Expression 41 in FIG. 31.

In this case, since six density matrix elements and six Fock matrix elements must be transferred during the calculation of the three electron repulsion integrals, the number of communicated item of data is 4[perERI]. This method is regarded better than the canonical ordering method in terms of the number of communicated items of data.

However, if it is assumed here that the time for calculation of an electron repulsion integral represented by primitive basis functions in a processor element is, for example, 2 microseconds (=$10^{-6}$ seconds. Hereinafter, microsecond is denoted by "$\mu s$"); the average number of contractions of the contracted basis function is 1.5; and the density matrix elements and Fock matrix elements have a data size of a double precision floating point number, i.e., 64 bits, the time required for calculation of an electron repulsion integral represented by one contracted basis function is approximately 10 $\mu s$. As a result, communication performance of 25.6 Mbps (25.6×$10^6$ bits per second) per processor element is required between the host computer and processor elements.

For example, when the number M of the processor elements is 100 in order to improve calculation performance, overall communication performance of 2560 Mbps is required. It is not easy to achieve such communication performance with the present techniques.

For example, an inexpensive communication device, e.g., serial communication according to IEEE 1394 bus standard specifications can achieve communication performance of 200 Mbps. However, when parallel calculation of Fock matrix elements is carried out according to the triple sort method using the same, the entire processing time is dominated by the communication time, which eliminates the effect of reducing calculation time utilizing symmetry of a matrix.

Third algorithm is a method referred to as "simple blocked method". This method can be further classified into a version based on the canonical ordering method and a version based on the triple sort method. The third algorithm is a method in which blocks of contracted basis functions are formed to improve utilization efficiency of density matrix elements and Fock matrix elements, thereby reducing the amount of communication.

This method will now be described based on the triple sort method.

First, N contracted basis functions are divided into n (=N÷$I_C$) blocks each of which is therefore formed by $I_C$ functions. Let us assume here that the blocks are numbered by $I_B$, $J_B$, $K_B$ and $L_B$. Then, four contracted basis function blocks $I_B$, $J_B$, $K_B$ and $L_B$ and six density matrix element blocks $P(I_B, J_B)$, $P(I_B, K_B)$, $P(I_B, L_B)$, $P(J_B, K_B)$, $P(J_B, L_B)$ and $P(K_B, L_B)$ that satisfy Expression 42 in FIG. 31 are passed to one processor element. The number of the passed density matrix elements is $6I_C^2$.

The processor element calculates $3I_C^4$ electron repulsion integrals which correspond to G(I, J, K, L), G(I, K, J, L) and G(I, L, J, K), and the processor element calculates Fock matrix element blocks $F(I_B, J_B)$, $F(I_B, K_B)$, $F(I_B, L_B)$, $F(J_B, K_B)$, $F(J_B, L_B)$ and $F(K_B, L_B)$ similarly to the above-described Expression 41 and returns the results to the host computer.

The number of the Fock matrix elements returned this time is also $6I_C^2$. As a result, the number of communicated items of data is $12I_C^2 \div 3I_C^4 = 4/I_C^2$[perERI]. That is, the utilization efficiency of the density matrix elements and Fock matrix elements becomes higher to reduce the amount of communication, the greater the number of contracted basis functions in a block.

In this case of the canonical ordering methods, it uses the expression 43 instead of the exparession 42.

A fourth method for reducing the amount of communication is a row-blocked method. This method is a version of the simple blocked method in which one processor element is assigned all of calculations of $I_B$, $J_B$, $K_B$ and $L_B$ where $I_B$, $J_B$, $K_B$ are the same combinations and only $L_B$ is different. FIG. 20 shows a flow chart of this method. The arrows in dotted lines in FIG. 20 indicate that the execution of the processes subsequent to the parts indicated by the arrows is not made wait by the preceding processes and that the processes wait for input of information from another processing system.

The row-blocked method can be also classified into a version based on the canonical ordering method and a version based on the triple sort method. The version based on the triple sort method will now be described with reference to the flow chart in FIG. 20.

First, similarly to the simple blocked method, N contracted basis functions are divided into n (=N÷$I_C$) blocks each of which is therefore formed by $I_C$ functions (step S1) Next, the host processor determines a combination ($I_B$, $J_B$, $K_B$) of contracted basis function blocks $I_B$, $J_B$, $K_B$ to be assigned to a particular processor element (step S2).

Next, the host computer transmits density matrix element blocks $P(I_B, J_B)$, $P(I_B, K_B)$ and $P(J_B, K_B)$ each having $I_C \times I_C$ elements and rows of density matrix elements $P(I_B, L)$, $P(J_B, L)$ and $P(K_B, L)$ each having $K_B \times I_C \times I_C$ elements associated with three contracted basis function blocks $I_B$, $J_B$ and $K_B$ that satisfy the above-described Expression 42 to the processor element (steps S3 and S4). L represents the entire range of $K_B \times I_C$.

Upon receipt of the blocks at steps S11 and S12, the processor element activates an internal loop associated with L's to calculate electron repulsion integrals and Fock matrix elements similarly to the simple blocked method (step S13). When the calculation is completed for all L's, the processor element returns rows of Fock matrix element blocks F($I_B$, L), F($J_B$, L) and F($K_B$, L) each having $K_B \times I_C \times I_C$ elements and Fock matrix elements F($I_B$, $J_B$), F($I_B$, $K_B$) and F($J_B$, $K_B$) each having $I_C \times I_C$ elements to the host computer (steps S14 and S15).

The host computer receives them at steps S5 and S6. The process then returns to step S2 from which the above-described process is repeated.

Such a configuration further improves the utilization efficiency of density matrix elements and Fock matrix elements arrangement and reduces the number of communicated item of data per electron repulsion integral to 2/$NI_C$+2/$I_C^2$ [perERI] which is about one half the number of data in the case of the simple blocked method if it is assumed that N>>$I_C$.

When an update of combinations of $I_B$, $J_B$ and $K_B$ on the processor element results in only a change associated with $K_B$, the F($J_B$, $L_B$) and F($K_B$, $L_B$) similarly to the above-described Expression 41 and returns the results to the host computer, the matrix element blocks P($I_B$, $J_B$) and F($I_B$, $J_B$) and the row of matrix element blocks P($I_B$, L(, P($J_B$, L(, F($I_B$, L) and F($J_B$, L) can be left as they are on the processor element and can be reused. This further reduces the number of communicated items of data to 4/3$NI_C$+2/3$I_C^2$ [perERI].

The article 3 has introduced a clustering method as a fifth method for further improving the utilization efficiency of density matrix elements and Fock matrix elements based on the same principle as that of the row-blocked method. However, this method will not be described here because it is regarded as an unpreferable method from the viewpoint of load distribution and scalability.

[Problems Associated with Cut-off]

Even the fourth algorithm which is the most preferable among the methods disclosed in the above-described article 3 has a problem when cut-off is taken into consideration. An example of such a problem will be described below. Let us assume here that α represents the ratio of survivors from a cut-off; M represents the number of processor elements; Teri(µs) represents time required for calculation of one electron repulsion integral G(I, J, K, L); and the data length of a matrix element is 64 bits.

In the case of the canonical ordering method, the minimum amount of communication per job assigned to one processor element (i.e., the amount of communication in the case that a change occurs only in $K_B$ when combinations are updated) is:

$2(2I_C^2+K_BI_C^2) \times 64$ (bits)

Since the number of electron repulsion integrals calculated in the processor element is $\alpha^2 K_B I_C^4$, required overall communication performance is as expressed by Expression 44 in FIG. 32.

In the case of the triple sort method, the minimum amount of communication per job assigned to one processor element (i.e., the amount of communication in the case that a change occurs only in $K_B$ when combinations are updated) is:

$2(2I_C^2+K_BI_C^2) \times 64$ (bits)

Since the number of electron repulsion integrals calculated in the processor element is $3\alpha^2 K_B I_C^4$, required overall communication performance is as expressed by Expression 45 in FIG. 32.

When the number M of processor elements for parallel processing is 100; time required for calculating an electron repulsion integral g(i, j, k, l) represented by primitive basis functions in a processor element is 2 µs; the average number of contractions of contracted basis functions is 1.5 (therefore, the calculation time Teri per electron repulsion integral G(I, J, K, L) is 10 µs); and the ratio α of survivors from a cut-off is 0.05, the dependence of communication performance required between the host computer and processor elements on the block sizes $I_C$ is calculated as shown in FIG. 21 in the case of the canonical ordering method and is calculated as shown in FIG. 22 in the case of the triple sort method.

While the required communication performance changes depending on the value of $K_B$ in both of the canonical method and triple sort method, the amount of change is small when $K_B$>100 and, for example, the block size $I_C$ may be set at 50 in the case of the canonical ordering method and at 30 in the case of the triple sort method depending on the actual communication performance.

While calculations can be carried out using such methods in a system utilizing many workstations having a sufficiently large data storage capacity which is assumed in the article 3, an enormous cost is required to configure such a system.

In a computing system utilizing inexpensive dedicated processor elements to which memories having a small capacity on the order of several tens Mbits are connected as disclosed in the article 2, the number of rows of matrix elements that can be stored is 10 or less, i.e., the permitted block size is about 2 or 3.

In this case, it is not possible to perform efficient processing whose speed is not determined by communication performance considering the fact apparent from FIG. 21 or 22 that the use of low-cost serial communication according to IEEE 1394 bus standard specifications as a communication device provides performance of only 200 Mbps.

SUMMARY OF THE INVENTION

The present invention has been made in view of the above circumstances and provides a method for parallel processing which allows efficient calculations of matrix elements even in parallel calculations with an inexpensive communication device and plural processor elements having a memory of a small capacity free of domination of the performance of communication between the host computer and the processor elements in terms of processing speed.

According to a first aspect of the present invention, there is provided a method for parallel processing utilizing a parallel processing apparatus having a host computer and at least one processor element to obtain all elements of a matrix F whose elements are a sum F(R, S)=F1(R, S)+F2(R, S) where F1(R, S) is a sum regarding all of variables T and U within a range from 1 to N (N is a positive integer) in product A1·P(T, U)·G(R, S, T, U) of functional values G(R, S, T, U) of a function G satisfying a relationship expressed using four integral type variables R, S, T and U within the same range from 1 to N (N is a positive integer) satisfying a relationship G(R, S, T, U)=G(R, S, U, T)=G(S, R, T, U)=G(S, R, U, T)=G(T, U, R, S)=G(T, U, S, R)=G(U, T, R, S)=G(U, T, S, R), elements P(T, U) of a matrix P satisfying a relationship P(T, U)=P(U, T) and a coefficient A1 and where F2(R, S) is a sum of all of the variables T and U within the range regarding product A2·P(T, U)·G(R, U, T, S) of the functional values G(R, U, T, S), matrix elements P(T, U) and coefficient A2. The method includes the steps of forming a triple loop associated with the variables R, S, T and U, making the outermost loop of the triple loop associated with combinations of the variables R and T satisfying relationships R≦N and T≦R, making the second loop inside the outermost loop associated with the variable S while making the third loop inside the second loop associated with the variable U, or alternatively making the second loop associated with the variable U while making the third loop associated with the variable T, setting the value of the variable S within the range from 1 to R, setting the value of the variable U within the range from 1 to R, and calculating predetermined one among the functional values G(R, S, T, U) inside the third loop and calculating a predetermined part of the matrix elements F using the result of the calculation. The second and third loops are combined to form one job unit, and the plural processor elements performs processing on the basis of the job units.

According to a second aspect of the invention, there is provided a method for parallel processing in which molecular orbital calculation for calculating the energy of a molecule represented using N (N is a positive integer) contracted shells is carried out using a parallel processing apparatus having a host computer and at least one processor element. The method includes the step of obtaining all matrix elements F(I, J) of a Fock matrix F represented ba sum regarding all primitive basis functions included in contracted basis functions I and J one of whose elements is primitive basis functions i and j respectively included in a sum f(I, J)=f1(I, J)+f2(I, J) where f1(I, J) is a sum regarding all of contracted basis functions in product A1·P(K, L)·g(i, j, k, l) of functional values g(i, j, k, l) of an electron repulsion integral function g represented using primitive basis functions i, j, k and l which are components of respective primitive shells r, s, t and u included in respective contracted shells R, S, T and U as indices, elements P(K, L) of a density matrix P represented using a contracted basis function K one of whose component is the primitive basis function k and a contracted basis function L one of whose component is the primitive basis function l as indices and a coefficient A1 and where f2(I, J) is a sum regarding all contracted basis functions in product A2·P(K, L)·g(i, k, j, l) of functional values g(i, j, k, l) of the electron repulsion integral function, the elements P(K, L) of the density matrix P and a coefficient A2. The calculation includes the steps of forming an outermost loop which is a loop associated with combinations of the contracted shells R and T satisfying relationships R≦N and T≦R, forming a second loop inside the outermost loop as a loop associated with the contracted shell S and a third loop inside the second loop as a loop associated with the contracted shell U or alternatively forming the second loop as a loop associated with the contracted shell U and the third loop as a loop associated with the contracted shell T, setting the value of the contracted shell S within the range from 1 to R, setting the value of the contracted shell U within the range from 1 to R, and calculating predetermined one among the electron repulsion integrals inside the third loop and calculating a predetermined part of the Fock matrix elements using the result of the calculation. The second and third loops are combined to form one job unit, and the plural processor elements are assigned processes which are in the job units.

BRIEF DESCRIPTION OF THE DRAWINGS

Preferred embodiment of the present invention will be described in detail based on the following figures, wherein:

FIG. 2 illustrates program codes showing an algorithm based on a triple sort method in the form of conventional Foster's row-blocked algorithm as an example comparative to the embodiment of the invention;

FIG. 3 illustrates program codes showing an RT parallel algorithm according to the embodiment of the invention;

FIG. 6 illustrates an example of a cut-off table provided on the host computer in the embodiment of the invention;

FIG. 9 illustrates an example of a format of Fock matrix information transmitted from the processor element to the host computer in the embodiment of the invention;

FIG. 10 illustrates an example of assignment of matrix information to memories in the embodiment of the invention;

FIG. 23 shows expressions used for explaining the ab initio molecular orbital calculation;

FIG. 24 shows expressions used for explaining the ab initio molecular orbital calculation;

FIG. 25 shows expressions used for explaining the ab initio molecular orbital calculation;

FIG. 26 shows expressions used for explaining the ab initio molecular orbital calculation;

FIG. 27 shows expressions used for explaining the ab initio molecular orbital calculation;

FIG. 28 shows expressions used for explaining the method for calculating electron repulsion integrals in the article 1;

FIG. 29 shows other expressions used for explaining the method for calculating electron repulsion integrals in the article 1;

FIG. 30 shows expressions used for explaining conventional Foster's algorithm; and FIG. 31 and FIG. 32 show expressions used for explaining conventional Foster's algorithm.

DETAILED DESCRIPTION OF PREFERRED EMBODIMENT

A preferred embodiment of the present invention will now be described with reference to the drawings. An inexpensive computer system 1 as shown in FIG. 1 is used in the embodiment described below.

Figure 1:
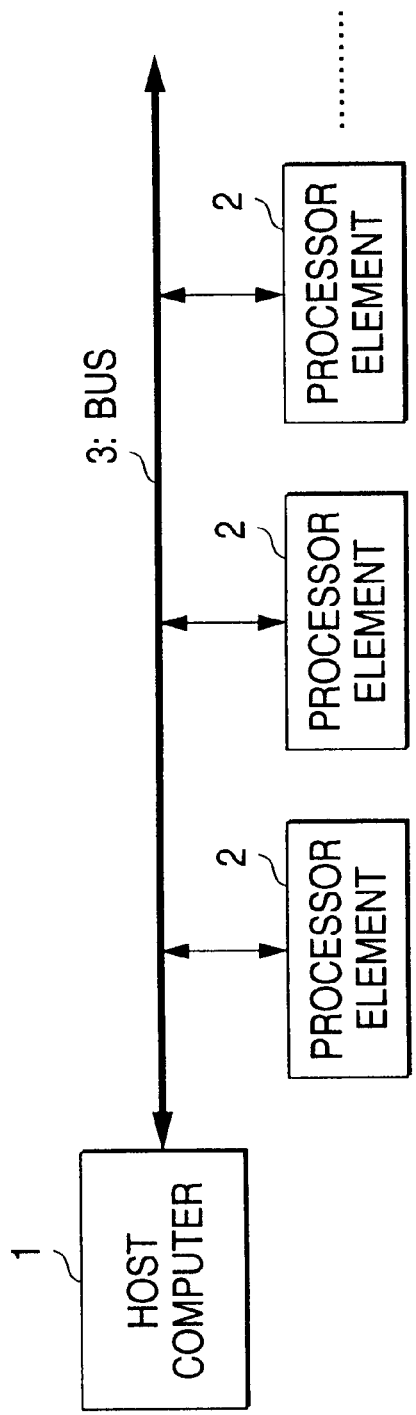
FIG. 1 is a block diagram of a system configuration of an embodiment of a parallel processing apparatus according to the invention.

FIG. 1 shows a general configuration of a parallel computing system of the present embodiment in which plural processor elements 2 are connected to a host computer 1 through a bus 3. For example, an IEEE 1394 serial bus is used as the bus 3.

The storage capacity of each of the processor elements 2 is several tens Mbits, e.g., 20 Mbits, and elements are used which have a sufficient capacity to store ten rows of each of a density matrix and a Fock matrix whose elements are represented by floating point numbers of 64 bits even if their size is 10000×10000. It is quite feasible to provide each processor element with a memory having a capacity on such an order with present techniques.

FIG. 2 shows overall calculation algorithm of a conventional triple sort method represented in the form of program codes for comparison with a method for matrix element calculation in the present embodiment.

In FIG. 2, Nshell is an integral type variable representing the total number of contracted shells; R, S, T and U are integral type variables used in contracted shell numbers; I, J, K and L are integral type variables used in contracted basis numbers; G_IJKL, G_IKJL, G_ILJK are real type variables used in numerical values of electron repulsion integrals; and P and G are real type two-dimensional arrays used in Fock and density matrices.

It is assumed here that contracted bases are numbered with serial numbers and that the numbers of contracted bases that make up the same contracted shell are continuous. b_basis and e_basis are integral type functions whose return values are the first and last numbers of contracted bases that make up contracted shells corresponds to numbers which are arguments of those functions. Further, G is an real type function for calculating an electron repulsion integral uniquely defined by contracted bases corresponding to four numbers I, J, K and L which are arguments of the function according to the above-described Expression 23.

According to the conventional triple sort method shown in FIG. 2, density matrix elements P[I] [J], P[I] [K], P[I] [L], P[J] [K], P[J] [L ] and P[K] [L] are used for multiplication with addition of Fock matrix elements carried out in the innermost loop of the quadruple loop for the calculation of contracted shells.

Therefore, regardless of the order of the formation of the quadruple loop regarding contracted shells, the frequency of transmission of density matrix elements from the host computer 1 to the processor elements 2 is on the order of 1 ($\frac{1}{3}$ in the case of the triple sort method) in terms of the number of matrix elements per electron repulsion integral.

In the above-described conventional blocked methods, reusability of matrix elements is improved to reduce the frequency of the transmission of density matrix elements to a constant smaller than 1. Such a constant is inversely proportionate to the square of a block size. If it is assumed to use a low-cost system as shown in FIG. 1, since the block size can not be increased beyond an upper limit put by the capacity of the memories of the processor elements 2, the frequency of transmission of density matrix elements is not so significantly reduced from 1.

Further, Fock matrix elements obtained as a calculation result are F[I] [J], F[I] [K], F[I] [L], F[J] [K], F[J] [L] and F[K] [L], and the frequency of transmission of Fock matrix elements from the processor elements 2 to the host computer 1 is completely the same as that of density matrix elements. When a cut-off is considered, a problem arises in that the frequency of communication increases in an inversely proportionate relationship with the square of the ratio a of survivors from the cut-off.

The algorithm of the present embodiment makes it possible to reduce the dependence of communication frequency on the ratio a of survivors from a cut-off, thereby suppressing the amount of communication. FIG. 3 shows the calculation algorithm of the present embodiment represented in the form of program codes.

Specifically, the outermost loop of the algorithm shown in FIG. 3 is a loop associated with combinations (RT) of contracted shells R and T that satisfy R≦Nshell and R≧T; the second loop is a loop associated with contracted shells S; and the third loop is a loop associated with contracted shells U. In this case, the value of S can range from 1 to R, and the value of U also can range from 1 to R. Further, calculation of a functional value G(R, S, T, U) and calculation of a part of predetermined matrix elements F using the calculation result is carried out inside the third loop.

The second and third loops may be loops associated with U and S respectively. That is, while the loop associated with U is formed inside the loop associated with S in FIG. 3, the order of the loops may be reversed.

One job unit is formed by the two loops, i.e., the second and third loops in which R and T are fixed, and each job unit is processed by the plural processor elements 2.

At this time, the host computer 1 performs calculation of initial values of all matrix elements P, SCF calculation which is performed in cooperation with the processor elements and determination on whether to continue the SCF calculation or not. During SCF calculation, the host computer 1 determines assignment of job units having fixed R and T to the plural processor units, selects a part of the matrix elements of the matrix P to be transmitted to the processor elements, transmits the selected matrix elements to the processor elements, receives a part of the matrix elements of a matrix F transmitted by the processor elements and updates the matrix P using the matrix F.

The processor elements 2 receive the part of the matrix elements of the matrix P transmitted by the host computer, control the loop associated with contracted shells and the loop associated with contracted shells U, calculate the function G(R, S, T, U) or a function g(i, j, k, l(, calculate the part of the matrix elements of the matrix F and transmit the part of the matrix elements of the matrix F to the host computer.

In the present embodiment, the density matrix elements and the Fock matrix elements communicated between the host computer 1 and the processor elements 2 are limited to P[I][J], P[I][L], P[J][K], P[K][L] and F[I][J], F[I][L], F[J][K], F[K][L] respectively, and the processor elements 2 calculate only the electron repulsion integral G_IJKL. In the present embodiment, the communication frequency of the matrix elements is on the order of 1/N.

A description will now be made on the reason for the fact that the communication frequency of the matrix elements can be on the order of 1/N in the calculation algorithm in FIG. 3.

As described above, the outermost loop in FIG. 3 is a loop associated with numbers RT of combinations of contracted shells R and T (hereinafter referred to as "RT pairs"). The total number of the combinations of R and T is Nshell× (Nshell+1)/2. The following description is on an assumption that R≧T. Therefore, R can range from 1 to Nshell, and T can range from 1 to R.

For simplicity, FIG. 3 shows that the loops are executed on RT from 1 through Nshell×(Nshell+1)/2 and on S and U from 1 through R in the respective ascending orders of the numbers. However, it is not essential to execute the loops in such orders. Further, S and U are not required to take all values from 1 through R.

There is a quadruple loop associated with contracted bases I, J, K, L in the loop associated with contracted shells U, and the algorithm calculates electron repulsion integrals and performs multiplication with addition of a Fock matrix in accordance with conditions which depend on the mutual relationship between I, J, K, L in the loop. The above conditional branch makes it possible to calculate Fock matrix elements as expressed by Expression 15 without any excess or short of calculations.

As described above, according to the algorithm shown in FIG. 3, the loop associated with contracted shells R and T is controlled by the host computer 1, and jobs inside the loop associated with contracted shells S are performed by the processor elements 2. Specifically, each processor element 2 is assigned a job having a fixed combination of contracted shells of R and T (RT pair). In a processor element 2 assigned with a job having a certain fixed RT pair, density matrix elements P[I][J], P[I][L], P[J][K] and P[K][L] are used.

Since I and K are contracted bases respectively constituting contracted shells R and T, the numbers of them are fixed when at the time of job assignment (one each for a contracted shell of the s-orbital; three each for a contracted shell of the p-orbital; and six each for a contracted shell of the d-orbital). J and L are in arbitrary quantities.

Therefore, the number of density matrix elements transmitted from the host computer to a processor element 2 for a job associated with an RT pair is on the order of a constant multiple of N. This equally applies to a Fock matrix. A processor element 2 has a memory with a capacity to store all of such elements.

Since the loops associated with contracted shells S and U are executed in a processor element to which a job having a fixed RT pair has been assigned, the number of electron repulsion integrals calculated therein is on the order of $N^2$. Therefore, the frequency of communication is 1/N per electron repulsion integral.

Since jobs are assigned to plural processor elements 2 in RT pairs, the algorithm of the invention is referred to as "RT parallel algorithm".

When a cut-off is to be considered in the RT parallel algorithm, the number of electron repulsion integrals calculated by the processor elements 2 decreases proportion to the square of the ratio α of the survivors. The numbers of the density matrix elements used for the calculation and the Fock matrix elements to be calculated can be also reduced in proportion to the ratio α of the survivors.

When the RT pairs to be assigned to the processor elements 2 have been decided, the host computer 1 can make a list of J's which survive IJ pair cut-off and L's which survive KL pair cut-off.

Therefore, the host computer can select and transmit only:

density matrix elements P[I][J] corresponding to J's surviving IJ pair cut-off among a row of density matrix elements P[I][J] in which I is fixed;

density matrix elements P[K][J] corresponding to J's surviving IJ pair cut-off among a row of density matrix elements P[K][J] in which K is fixed;

density matrix elements P[I][L] corresponding to L's surviving KL pair cut-off among a row of density matrix elements P[I][L] in which I is fixed; and density matrix elements P[K][L] corresponding to L's surviving KL pair cut-off among a row of density matrix elements P[K][L] in which K is fixed. Therefore, the number of the density matrix elements transmitted by the host computer decreases in proportion to α.

A processor element 2 calculates only:

Fock matrix elements F[I][J] corresponding to J's surviving IJ pair cut-off among a row of Fock matrix elements F[I][J] in which I is fixed;

Fock matrix elements F[K][J] corresponding to J's surviving IJ pair cut-off among a row of Fock matrix elements F[K][J] in which K is fixed;

Fock matrix elements F[I][L] corresponding to L's surviving KL pair cut-off among a row of Fock matrix elements F[I][L] in which I is fixed; and Fock matrix elements F[K][L] corresponding to L's surviving KL pair cut-off among a row of Fock matrix elements F[K][L] in which K is fixed.

Since the processor elements 2 are to transmit only Fock matrix elements calculated therein to the host computer 1, the number of Fock matrix elements transmitted from the processor elements 2 to the host computer 1 also decreases in proportion to the ratio a of survivors from the cut-off.

Therefore, when a cut-off is considered in calculation, the frequency of communication per electron repulsion integral increases in inverse proportion to the ratio α of survivors from the cut-off, which is significantly advantageous from a practical point of view compared to the prior art in which the frequency increases in inverse proportion to the square of α.

The required communication performance will now be formulated on an assumption that M represents the number of processor elements; Teri (µs) represents calculation time per electron repulsion integral; a represents the average number of contracted bases constituting one contracted shell; and the data length of matrix elements is 64 bits.

Let us assume that a density matrix element block P(R, S) is a set of density matrix elements P(I, J) represented by combinations of arbitrary contracted bases I constituting a contracted shell R and arbitrary contracted bases J constituting a contracted shell S. Then, the number of elements of the density matrix element block is about $a^2$. The elements of the density matrix element block P(R, S) in the range from S=1 to S=R which survive a cut-off of RS combinations are all transferred from the host computer 1 to the processor elements 2. Therefore, the number of the elements is $a^2 \times aR \times \alpha$.

Such a number of elements is substantially the same for other density matrix element blocks P(R, U), P(T, S) and P(T, U). The number of Fock matrix elements transmitted from the processor elements 2 to the host computer 1 is completely the same as the number of the density matrix elements. Therefore, the amount of data communicated between the host computer 1 and the processor elements 2 per job is $8\alpha a^3 R \times 64$ (bits).

Since the number of electron repulsion integrals calculated per job is approximately $\alpha^2 a^4 R^2$, the overall required communication performance is estimated as expressed by Expression 46 in FIG. 32.

Figure 4:
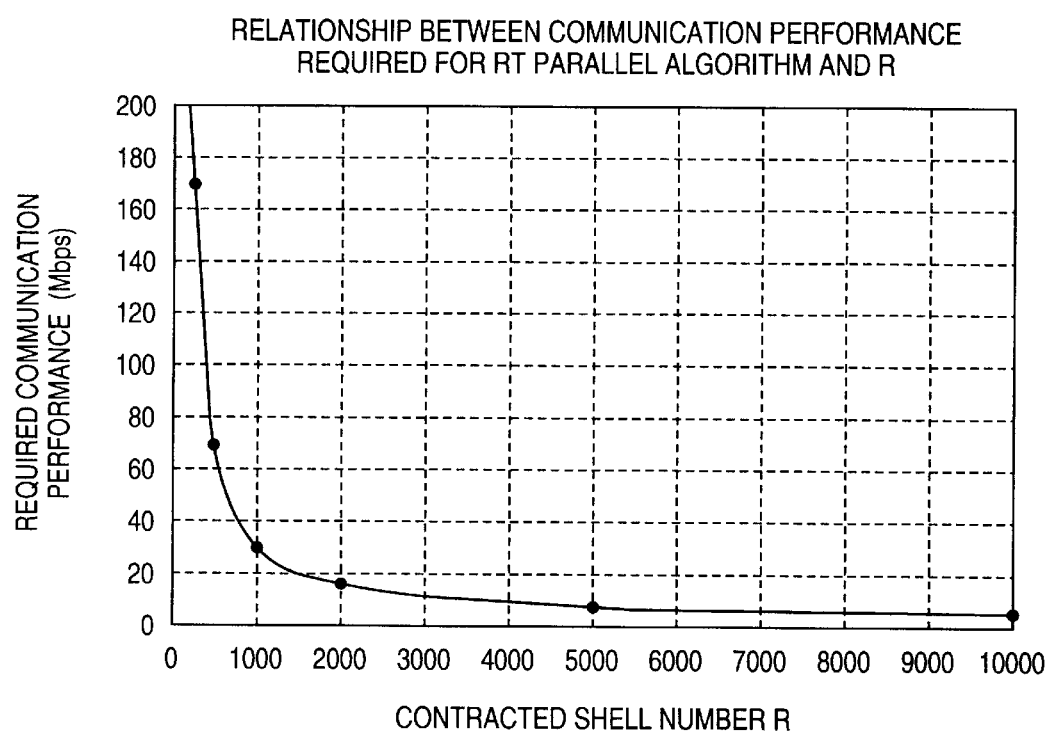
FIG. 4 illustrates the relationship between communication performance required for the RT parallel algorithm according to the embodiment of the invention and the numbers of contracted shells R.

FIG. 4 shows the dependence of the required communication performance on R on an assumption that the number M of the processor element 2 is 100; calculation time Teri per electron repulsion G(I, J, K, L) represented by primitive basis functions in the processor elements 2 is 10 µs; the average number a of contracted bases constituting one contracted shell is 3; and the ratio $\alpha$ of survivors from the cut-off is 0.05.

As apparent from FIG. 4, while the required communication performance exceeds 100 Mbps in a very small range where the contracted shells R are small, communication performance of 100 Mbps results in a communication time which can be sufficiently covered by the calculation time in most of the remaining region.

Considering the fact that the number of jobs per predetermined R is proportionate to $R^2$, there is a bare possibility that the communication time will exceed the calculation time. Therefore, the RT parallel algorithm of the present embodiment is efficient algorithm which will not reduce the processing efficiency of a system as a whole even when a low-cost communication device having communication performance on the order of 100 Mbps is used.

[More Specific Description]

The details of the method for parallel processing according to the present embodiment will now be more specifically described.

[(Processing Procedure of the Host Computer 1]

Figure 5:
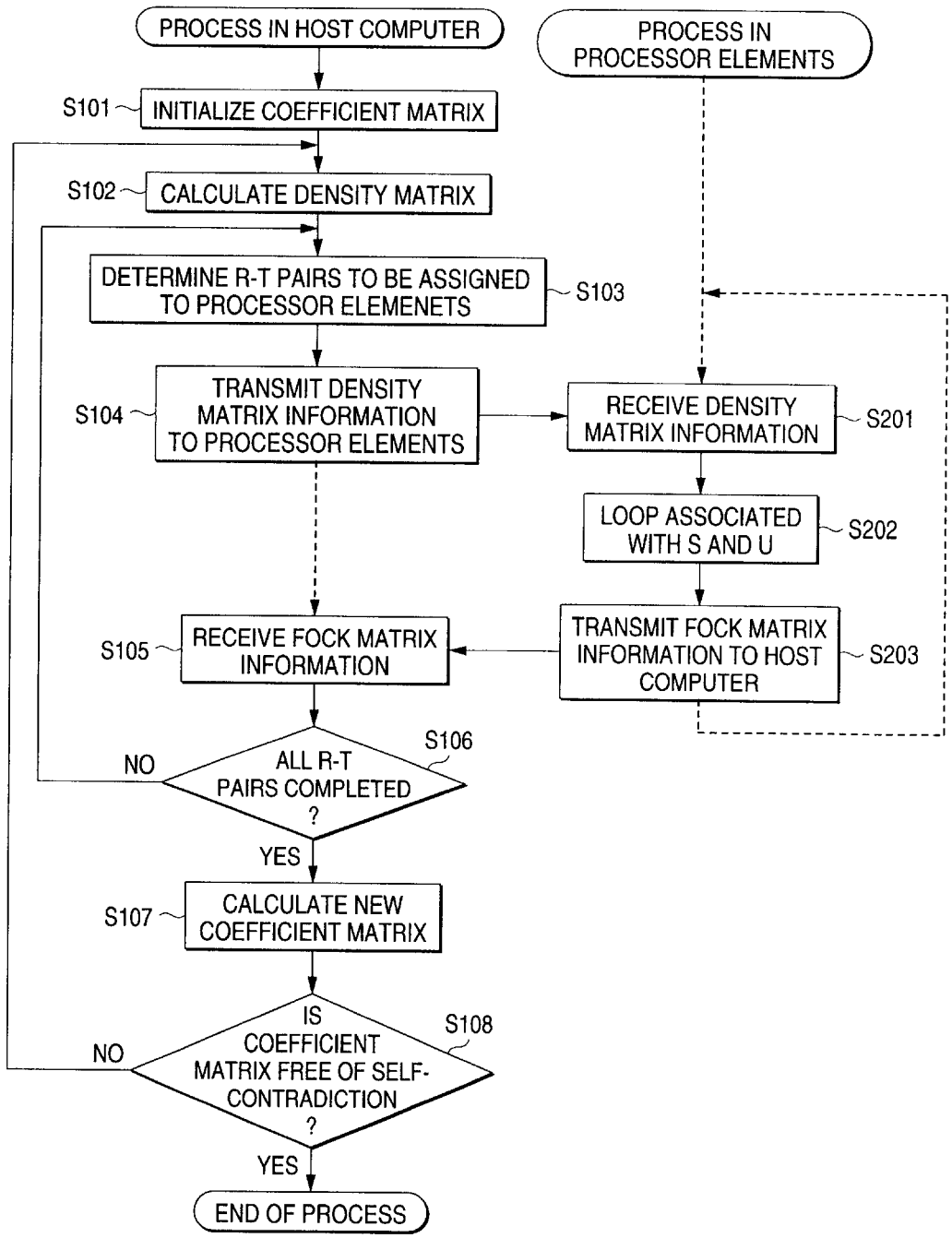
FIG. 5 is flowcharts of processes in a host computer and a parallel processor in the embodiment of the invention.

FIG. 5 shows flow charts that explain the method for parallel processing according to the present embodiment. Since different processes are performed by the host computer 1 and processor elements 2, a flow chart is shown for each of them.

Although plural processor elements 2 (typically 100 elements) are connected in parallel to the host computer 1, a flow of a process in one of the processor elements 2 is shown to represent them because the elements operate according to the same flow chart and there is no data correlation between the elements. A part indicated by an arrow in a dotted line in FIG. 5 indicates that the subsequent process waits for input of information from another processing system instead of waiting the end of the preceding process.

The processing procedure of the host computer 1 will be described first.

The host computer 1 initializes a coefficient matrix (step S101) and thereafter calculates a density matrix from the coefficient matrix according to Expression 18 (step S102). Next, it determines a combination of contracted shell numbers R and T, i.e., an RT pair to be assigned to a particular processor element 2 (step S103). RT pair numbers may be assigned in any order, and the order may be determined at random or determined according to predetermined rules.

Next, density matrix information associated with the RT pair number is transmitted to the processor element to which the RT pair number is assigned (step S104). The transmitted density matrix information is created taking cut-off conditions into consideration. The process performed by the host computer 1 at this time will be described later.

The processor element 2 receives the density matrix information from the host computer and stores it in a reception buffer memory (step S201). It controls the loops associated with contracted shells S and U with respect to the job on the assigned RT pair to calculate Fock matrix elements (step S202). When the calculation is completed, the resultant Fock matrix information is stored in a transmission buffer memory and is transmitted from the transmission buffer memory to the host computer 1 (step S203).

When the process at a certain processor element 2 is completed and the Fock matrix information is received from the processor element 2 (step S105(, the host computer 1 determines whether assignment of an RT pair number and transmission of density matrix information have been completed for the processor element 2 (step S107). If not completed, the process returns to step S103 to determine new assignment of an RT pair number and to transmit density matrix information associated with the RT pair number to the processor element 2.

The host computer 1 repeats the same operation to assign RT pair numbers and transmit density matrix information to all processor elements and waits for reception of a Fock matrix information from the processor elements.

When it is determined at step S106 that all RT pair numbers have been processed, the host computer 1 solves Expression 14 in FIG. 26 based on the collected Fock matrix information to calculate a new coefficient matrix (step S107). It compares the new coefficient matrix with the preceding coefficient matrix to determine whether a self-consistent solution has been obtained or not (step S108). If there is a sufficient match between those matrices, the computer determines that a self-consistent solution has been obtained and terminates the calculation. If not, it returns from step S108 to step S102 to generate a new density matrix according to Expression 18 and repeats the same operation.

A description will now be made on a cut-off process in the host computer 1.

For a given contracted shell R, the nuclear coordinate is represented by A; the minimum orbital exponent among primitive bases constituting the contracted shell R is represented by $\zeta_A$; and the corresponding primitive basis is represented by i. For an arbitrary contracted shell S, the nuclear coordinate is represented by B; the minimum the orbital exponent among primitive bases constituting the contracted shell S is represented by $\zeta_B$; and the corresponding primitive basis is represented by j.

As described in the section of the related art, whether an electron repulsion integral g(i, j, k, l) can be cut off with respect to arbitrary primitive bases k and l can be determined from a combination of numerical values ($\zeta_A$, A, $\zeta_B$, B). For example, it is determined whether Expression 47 in FIG. 32 is satisfied or not and, if the inequality in Expression 47 is true, it is determined that the integral can be cut off.

When a combination of two arbitrary primitive bases belonging to the same contracted shells respectively is considered, since they have orbital exponents greater than that described above, the numerical value of an exponential function calculated for the combination is always smaller than that described above.

Therefore, a combination of an arbitrary primitive basis constituting the contracted shell R and an arbitrary primitive basis constituting the contracted shell S can be cut off without fail if it is determined that the combination of the minimum orbital exponents can be cut off.

Such a determination is carried out on all contracted shells S, and the numbers of shells that survive such a cut-off when paired with a contracted shell R can be regarded a set.

Prior to an SCF calculation, the host computer 1 creates a database for each contracted shell showing a set of shell numbers that survive a cut-off when paired with the contracted shell. It is referred to as "cut-off table" in the present embodiment.

FIG. 6 shows an example of such a cut-off table. In this example, for example, when a contracted shell numbered 1 is chosen as R (R=1), the numbers of contracted shells S that survive a cut-off are 1, 2, 3 and 5. Since a processor element 2 performs calculation only when $S \leq R$ in the RT parallel algorithm, a processor element 2 to which R=1 is assigned calculates only the contracted shell S numbered 1.

Let us consider the case of R=4 as another example. The S numbers that survive the cut-off and satisfy $S \leq R$ are 2, 3 and 4.

The cut-off table in FIG. 6 may be applied to a cut-off determination on TU combinations in completely the same manner. For example, for a contracted shell T numbered 1, the numbers of contracted shells U that survive the cut-off are 1, 2, 3 and 5. Since a processor element 2 performs calculation only when $U \leq R$ in the RT parallel algorithm, the U number calculated by the processor element 2 varies depending on the R number assigned to the processor element 2 with T=1.

For example, if R=10, the U numbers are 1, 2, 3 and 5, and the U numbers are 1 and 2 if R=2.

When the SCF calculation is started and an RT pair number to be assigned to a certain processor element 2 is determined, the host computer 1 creates density matrix information with reference to the cut-off table.

Let us assume that contracted bases constituting contracted shells R, S, T and U are represented by I, J, K and L, respectively. Then, the host computer 1 transmits density matrices P(I, J(, P(I, L(, P(K, L) and P(K, J) to the processor element 2, and the processor element 2 calculates an electron repulsion integral G(I, J, K, L).

Whether a P(I, J) is necessary or not depends on whether G(I, J, K, L) survives the cut-off. Therefore, the numbers used as S are listed up from among the numbers shown in the cut-off table and density matrices P(I, J) may be chosen which have contracted bases J constituting those contracted shells.

Since whether G(I, J, K, L) survives the cut-off or not with respect to J is determined by whether RS combinations are cut off or not, it can be determined in completely the same manner whether a P(K, J) is necessary or not. That is, the sets of J numbers to be transmitted for P(I, J) and P(K, J) are completely identical.

Therefore, if a set of Nv contracted shells among R contracted shells satisfying $S \leq R$ that survive a cut-off on RS combinations is represented by V={V[1], V[2], ..., V[Nv]}, the density matrix information transmitted from the host computer 1 to the processor elements 2 may include the number Nv of the elements of the set V, the elements of the set V, i.e., V[1], V[2], ..., V[Nv] and a density matrix data block associated with V[x] (x=1 through Nv) as information regarding P(I, J) and P(K, J).

The contents of the density matrix data block associated with V[x] may be numerical values of P(I, M) for arbitrary combinations of all contracted bases I constituting the contracted shell R and contracted bases M constituting the contracted shell V[x] and numerical values of P(K, M) for arbitrary combinations of all contracted bases K constituting the contracted shell T and contracted bases M constituting the contracted shell V[x].

Similarly, the numbers of used contracted shells U can be listed up from the cut-off table to select P(I, L) and P(K, L) to be used in the processor elements 2.

If a set of Nw contracted shells among R contracted shells satisfying $U \leq R$ that survive a cut-off on TU combinations is represented by W={W[1], W[2], ..., W[Nw]}, the density matrix information transmitted from the host computer 1 to the processor elements 2 may include the number Nw of the elements of the set W, the elements of the set W, i.e., W[1], W[2], ..., W[Nw] and a density matrix data block associated with W[x] (x=1 through Nw) as information regarding P(I, J) and P(K, J).

The contents of the density matrix data block associated with W[x] may be numerical values of P(I, N) for arbitrary combinations of all contracted bases I constituting the contracted shell R and contracted bases N constituting the contracted shell W[x] and numerical values of P(K, N) for arbitrary combinations of all contracted bases K constituting the contracted shell T and contracted bases M constituting the contracted shell V[x].

[Form of Transferred Data]

A description will now be made on the contents of density matrix information and Fock matrix information.

Figure 7:
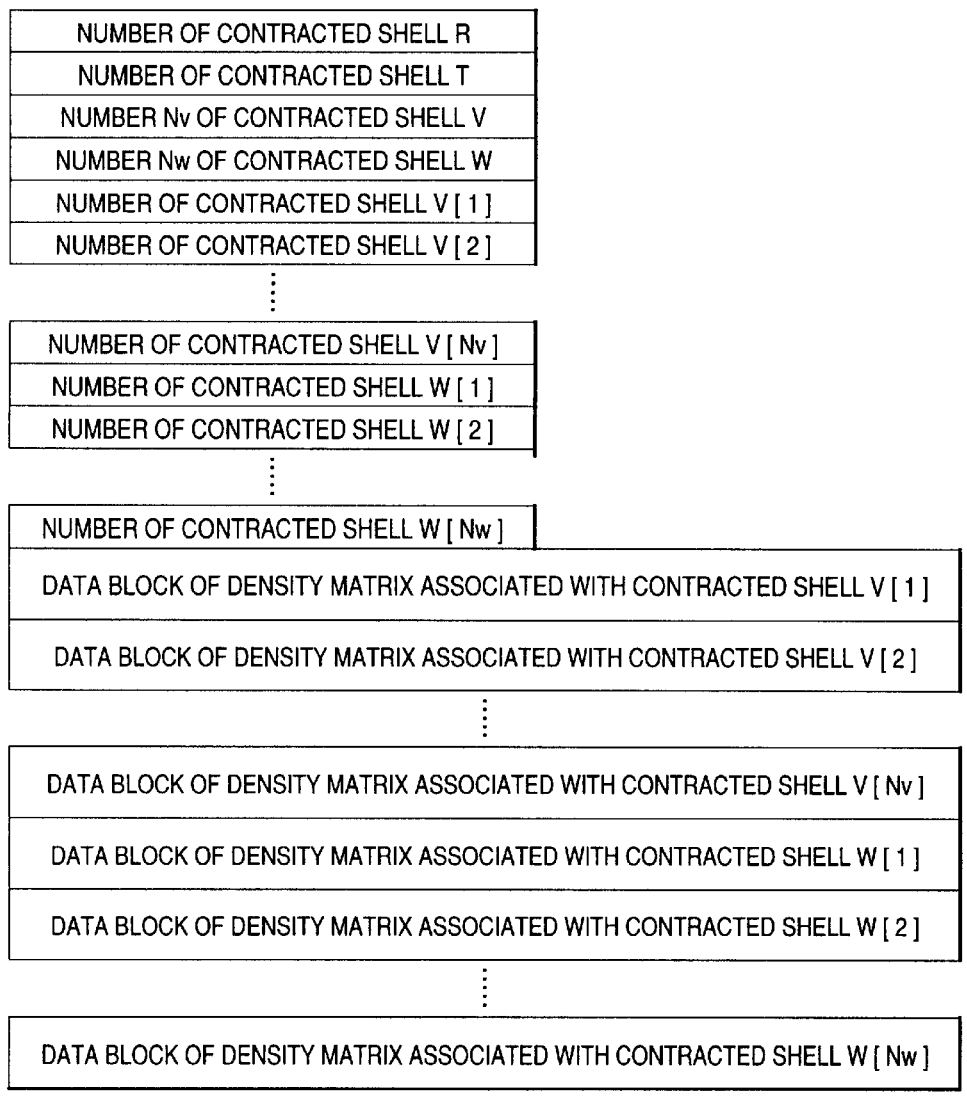
FIG. 7 illustrates an example of a format of density matrix information transmitted from the host computer to a processor element in the embodiment of the invention.

FIG. 7 shows an example of a format of density matrix information transmitted from the host computer 1 to the processor element 2. The number of the contracted shell R through the number of the contracted shell W[Nw] are integral type data. The density matrix data block associated with the contracted shell V[1] through the density matrix data block associated with the contracted shell W[Nw] are blocks constituted by one or plural floating point type data or fixed point type data.

The RT part number to be processed by the processor element 2 which has received density matrix information is determined by the numbers of the two contracted shells R and T at the top of FIG. 7. Since $T \leq R$, it is possible to determine the RT pair number from one item of integral. type data (RT) by determining the RT pair number (RT) using Expression 48 in FIG. 32 instead of using two contracted shell numbers.

This makes it possible to reduce the amount of information to be transferred by the amount of one item of integral data. However, the difference of one item of integral data is negligibly small relative to the data amount of the density matrix information as a whole, and the restoration of the numbers of the contracted shells R and T from the integral data (RT) determined as described above results in an increase in the amount of processing to be performed on the processor element 2. Therefore, it is preferable to use a format in which the numbers of the contracted shells R and T are separately described as shown in FIG. 7.

Referring to FIG. 7, the numbers of the contracted shells R and T are followed by two items of integral type data representing the numbers of the elements of the set of contracted shells V and the set of the contracted shells W.

Figure 8:
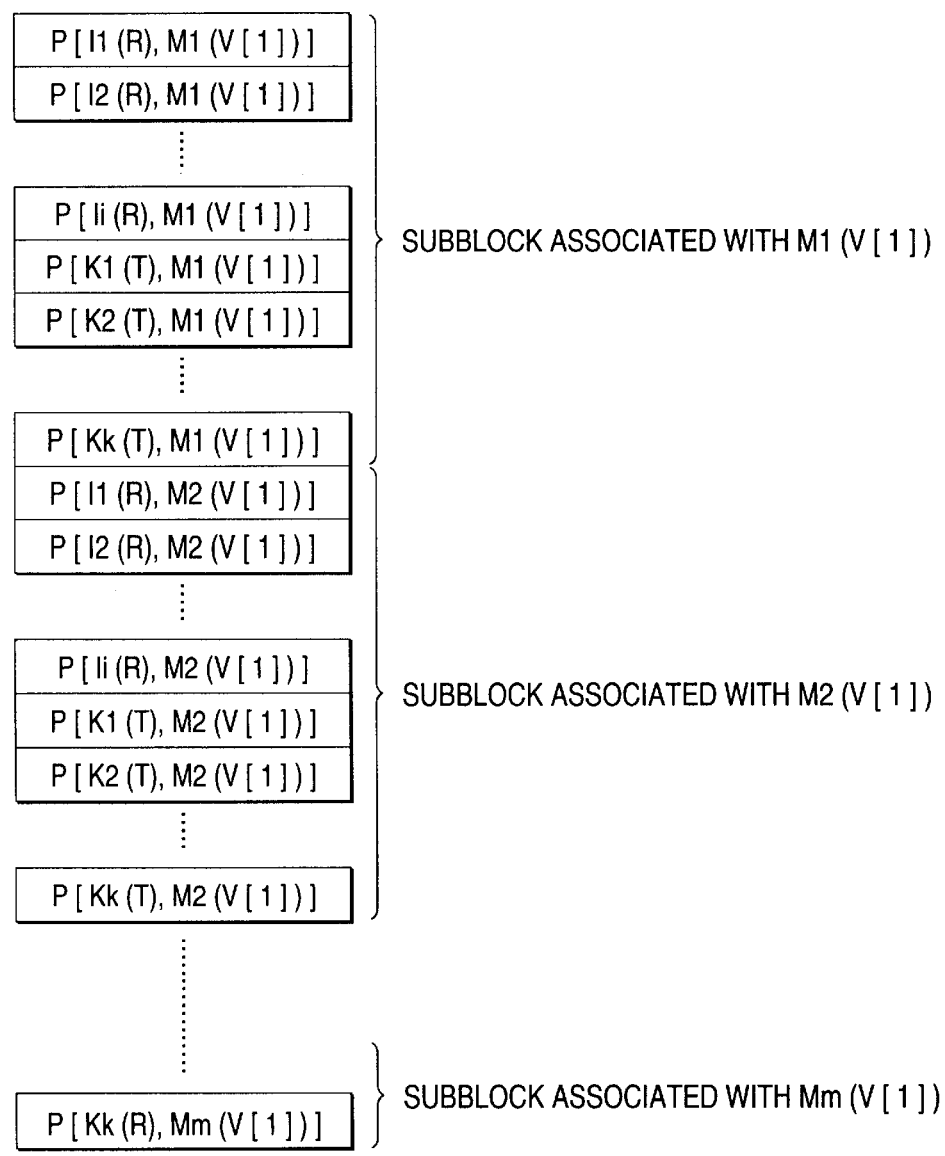
FIG. 8 illustrates an example of a configuration of a density matrix data block in the embodiment of the invention.

FIG. 8 shows a density matrix data block associated with the contracted shell V[1] as a typical example of a configuration of a density matrix data block.

When the orbital quantum number of a contracted shell is greater than 1, a density matrix data block associated with the contracted shell is formed by subblocks associated with the contracted bases. The example shown in FIG. 8 is a case in which there are m contracted bases M1(V[1]), M2(V[1]), . . . , Mm(V[1]) that constitute the contracted shell V[1] and in which there are m subblocks associated with respective contracted bases.

One subblock is subdivided into two regions. One is a region of density matrix elements whose indices are contracted bases I1(R) through Ii(R) constituting the contracted shell R and a contracted basis M1(V[1]). The other is a region of density matrix elements whose indices are contracted bases K1(T) through Kk(T) constituting the contracted shell T and a contracted basis M1(V[1]). Here, i and k represent the numbers of the contracted bases constituting the contracted shells R and T, respectively. The number of the density matrix elements included in those regions is determined by the orbital quantum numbers of the contracted shells R and T, and subblocks in a set of density matrix information are therefore in the same size.

FIG. 9 shows an example of a format of the Fock matrix information transmitted from the processor element 2 to the host computer 1. Only the numbers of the two shells at the top, i.e., the numbers of the contracted shells R and T are integral type data, and the subsequent Fock matrix data block associated with the contracted shell V[1] through the Fock matrix data block associated with the contracted shell W[Nw] are blocks constituted by one or plural floating point type data or fixed point type data.

Just as in the case of the density matrix information, the host computer 1 can recognize the RT pair number processed by the processor element 2 which has transmitted the Fock matrix information from the numbers of the two shells at the top, i.e., the contracted shells R and T. Those numbers may be replaced with an RT pair number which is one item of integral type data uniquely determined by R and T.

Further, the number of RT pair assigned to the processor element 2 may be recorded on the host computer 1 to cause the host computer 1 to determine the RT pair which is associated with Fock matrix information transmitted by the processor element 2 from a processor element recognition number instead of a number representing the RT pair.

The configuration of a Fock matrix data block is similar to that of the density matrix data block shown in FIG. 8. The Fock matrix information does not need to include the numbers of the elements of the contracted shell sets V and W and the information of the numbers of the contracted shells which constitute the density matrix information. The reason is that the host computer 1 can easily reproduce those items of information from R and T because the host computer 1 has a cut-off table thereon.

When the host computer 1 has a sufficiently large data storage capacity, it can maintain those items of information after transmitting the density matrix information to the processor element 2 until it receives the Fock matrix information from the processor element 2. In any case, the Fock matrix information transmitted from the processor element 2 to the host computer 1 does not need to include the numbers of the elements of the contracted shell sets V and W and the information of the numbers of the contracted shells, and the exclusion of such information from the Fock matrix information makes it possible to reduce the amount of data communicated between the processor element 2 and host computer 1.

FIG. 10 shows an example of the allocation of the density matrix information and Fock matrix information to a memory space in the processor element 2.

FIG. 10 is based on an assumption that addressing into the memory space in the processor element 2 is always word addressing. It is also assumed here that the number of the elements in the contracted shell set V is 1000 and that the number of the elements in the set W is 500.

The R and T numbers assigned to the processor element 2 are stored in addresses 0 and 1. The numbers Nv and Nw of the elements in the contracted shell sets V and W are stored in addresses 2 and 3. Addresses 4 through (4+Nv−1) are a region to store the contracted shell numbers V[1] through V[Nv], and addresses (4+Nv) through (4+Nv+Nw−1) are a region to store the contracted shell numbers W[1] through W[Nw]. Integral type data are stored in all of these addresses.

A space area is then disposed which is followed by addresses 2000 through 9999 which are a region to store the density matrix data block associated with the contracted shells V[1] through V[Nv] and addresses 10000 through 17999 which are a region to store the density matrix data block associated with the contracted shells W1 through W[Nw]. 4000 each P(I, J), P(K, J), P(I, L) and P(K, L) can be stored in each of those regions. Addresses 18000 through 25999 are a region to store the Fock matrix data block associated with the contracted shells V[1] through V[Nv] and addresses 26000 through 33999 are a region to store the Fock matrix data block associated with the contracted shells W1 through W[Nw]. 4000 each F(I, J(, F(K, J), F(I, L) and F(K, L) can be stored in each of those regions.

Even if it is assumed that one word occupies 64 bits on the memory, the capacity of those data regions is on the order of only 2 Mbits. Considering the fact that only data surviving the cut-off are stored, there is a sufficient region to store required data even in calculating molecular orbitals on the scale of several thousand bases or more. Current techniques allow memories having a data storage capability greater than that in the example to be incorporated at a very low cost.

[How to Execute Loops (Processing Procedure of Processor Element 2)]

Figure 11:
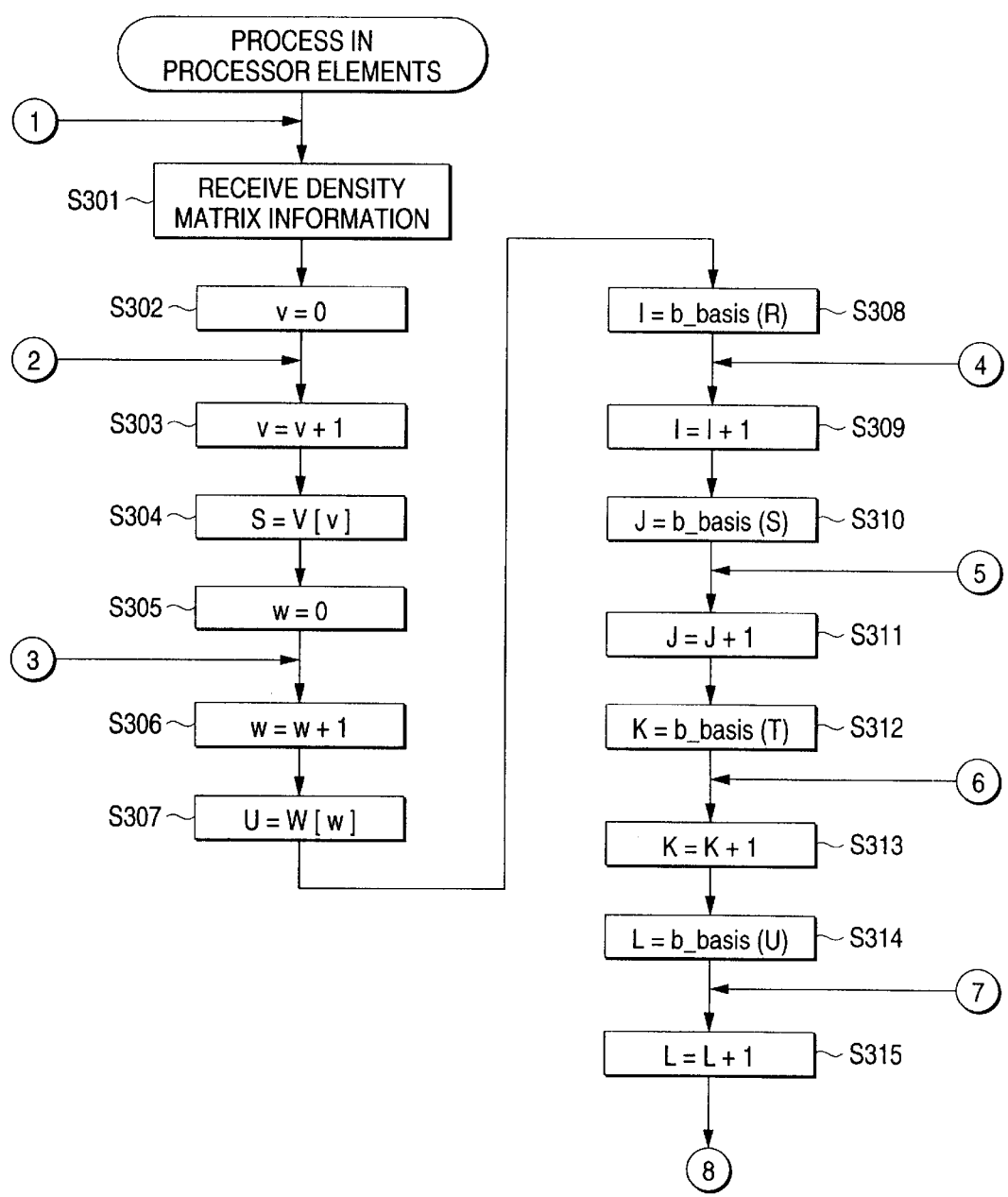
FIG. 11 is a part of a flowchart showing a process in the processor element in the embodiment of the invention.

A procedure for the process in the processor element 2 will now be described with reference to the flow charts in FIGS. 11 and 12.

First, the processor element 2 receives density matrix information from the host computer 1 and stores it in the memory (step S301). When the storage is completed, calculation of the loops associated with S and U is started.

The loop associated with S is controlled as described below. First, an integral type variable v is prepared and is initialized to zero (step S302). Next, the loop is entered, and the variable v is incremented by 1 (step S303) Then, the numerical values of the contracted shell V[v] are read from the memory and are substituted for S (step S304).

Figure 12:
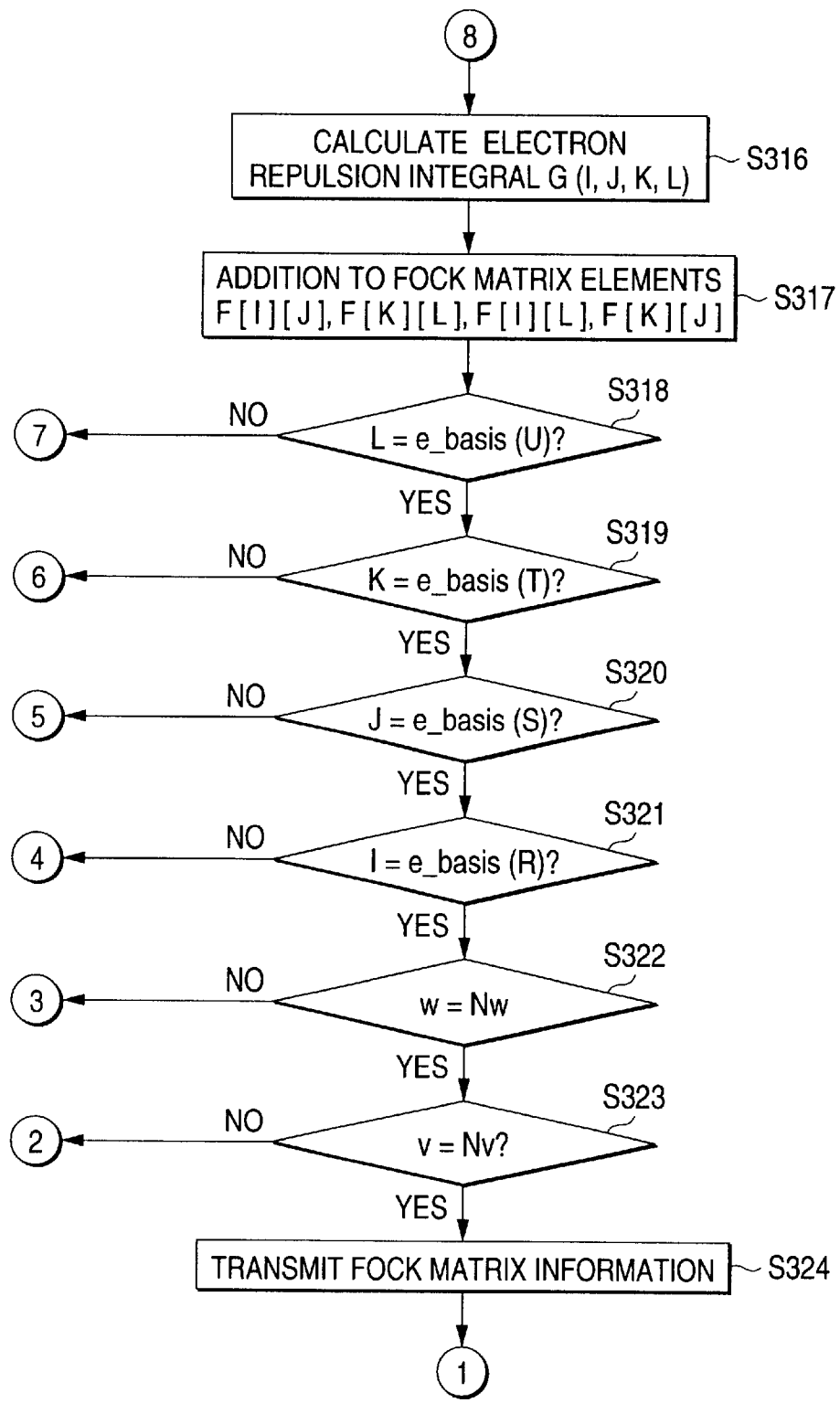
FIG. 12 is another part of the flowchart showing a process in the processor element in the embodiment of the invention.

After completing appropriate processing, the variable v and the number Nv of the contracted shells V are compared (step S323 in FIG. 12). If the variable v and the number Nv are equal, the loop associated with S is terminated, and Fock matrix information is transmitted to the host computer 1 (step S324) to terminate the process on the assigned RT pair. Thereafter, the processor element 2 waits for reception of density matrix information. If the variable v and the number Nv are not equal, the variable v is incremented by 1 at step S303, and the same process is repeated.

Similarly, the loop associated with U is controlled as described below. An integral type variable w is prepared and is initialized to zero (step S305) in the loop associated with S. Next, the loop is entered, and the variable w is incremented by 1 (step S306). Then, the numerical values of the contracted shell W[w] are read from the memory and are substituted for U (step S307).

After completing appropriate processing, the variable w and the number Nw of the contracted shells W are compared (step S322). If the variable w and the number Nw are equal, the loop associated with U is terminated, and it is determined if the variable v and the number Nv are equal at step S323. If the variable w and the number Nw are not equal at step S322, the process returns to step S306 to repeat the same process with the variable w incremented by 1.

As described above, the loops associated with S and U are controlled by reading the numerical values of the contracted shells V[1], V[2], . . . , V[Nv] and contracted shells W[1], W[2], . . . , W[Nw] stored in the memory sequentially and by using them as the numerical values of S and U. As a result, the processor element 2 is set at only numerical values associated with contract shells S and U which survive the cut-off, which allows loop control with very high efficiency.

Calculation of electron repulsion integrals and Fock matrix elements involved in calculation of molecular orbitals is carried out using contracted basis as units instead of contracted shells. Therefore, a quadruple loop is formed inside the loop associated with U, the loop being formed by a loop b_basis (R) through e_basis (R) associated with the contracted bases I constituting the contracted shell R (see steps S308, S309 and S321), a loop b_basis (S) through e_basis (S) associated with the contracted bases J constituting the contracted shell S (see steps S310, S311 and S320), a loop b_basis (T) through e_basis (T) associated with the contracted bases K constituting the contracted shell T (see steps S312, S313 and S319) and a loop b_basis (U) through e_basis (U) associated with the contracted bases L constituting the contracted shells U (see steps S314, S315 and S318). In the quadruple loop, the electron repulsion integrals G(I, J, K, L) are calculated (step S316), and calculation is performed to add the products of the electron repulsion integrals and the density matrix elements to the Fock matrix elements (step S317).

The numbers of contracted bases making up a contracted shell X are within the range from b_basis (X) to e_basis (X) provided that the contracted bases that make up the same contracted shell are numbered with serial numbers.

Calculation of electron repulsion integrals G(I, J, K, L) is always carried out in the quadruple loop unless the cut-off is carried out using something other than the RS and TU combinations.

Therefore, while the loops associated with S and U are executed, all of the density matrix elements stored in the memory are used for the multiplication with addition to the Fock matrix elements without fail. The amount of communication is unduly increased if the communication involves density matrix elements which are not used in the calculation. Since such wasteful communication is prevented, the processing performance of a system is not limited by the communication performance even if a low-cost communication device is used, which makes it possible to improve the processing efficiency of the system.

[Timing of Data Transfer and Countermeasure to Overflow of Matrix from Memory]

The density matrix elements P(I, J) and P(K, J) and Fock matrix elements F(I, J) and F(K, J) associated with the S-related loop among the loops associated with the contracted shells S and U may be transmitted and received using a procedure in which required density matrix elements are received from the host computer each time calculation of an electron repulsion integral G(I, J, K, L) is completed and in which Fock matrix elements are transmitted to the host computer each time calculation is completed.

However, since data communication is always accompanied by information related to the communication protocol in addition to the data to be communicated, the use of a smaller unit for information to be communicated can result in an increase in the amount of communication.

By communicating density matrix information and Fock matrix information per RT pair at a time between the host computer and the processor element, the increase in the amount of communication attributable to additional information accompanying a protocol can be minimized.

When the size of a system to be calculated is large or when the ratio of survivors from a cut-off is high because of a great threshold for the cut-off, it may not be possible to store all of the density matrix elements P(I, J(, P(K, J), Fock matrix elements F(I, J), F(K, J), density matrix elements P(I, L), P(K, L) and Fock matrix elements F(I, L), F(K, L) in the memory in the processor element 2. A processing method to be used in such a case will be described.

First, when all of the density matrix elements P(I, J), P(K, J) and Fock matrix elements F(I, J), F(K, J) can be stored in the memory in the processor element 2, the numbers of the contracted shells U are divided such that the density matrix elements P(I, L), P(K, L) and Fock matrix elements F(I, L), F(K, L) can be stored in the memory along with all of the above elements.

As a result, the job specified by the RT pair is divided into plural subjobs. Those subjobs are assigned to the same processor element 2, and the density matrix elements P(I, J) and P(K, J) are transmitted only once from the host computer 1 to the processor element 2 before the first subjob is started.

The reason is that all of those density matrix elements can be used commonly regardless of the value of the contracted shell U. The density matrix elements P(I, L) and P(K, L) may be transmitted from the host computer 1 to the processor element 2 before each of the subjob is started to be overwritten in the region of the density matrix elements P(I, L) and P(K, L) on the memory used for the preceding subjob. The reason is that those density matrix elements are used only in calculation associated with a particular contracted shell U.

Similarly, the Fock matrix elements F(I, L) and F(K, L) are transmitted from the processor element 2 to the host computer after each of the subjobs is completed, and the memory region therefor is released as a region to store the Fock matrix elements F(I, L) and F(K, L) calculated during the next subjob.

Since the Fock matrix elements F(I, J) and F(K, L) are used commonly in all subjobs, they are transmitted from the processor element 2 to the host computer 1 only once when all subjobs are completed.

When all of the density matrix elements P(I, L), P(K, L) and the Fock matrix elements F(I, L), F(K, L) are stored in the memory of the processor element 2 while not all of the density matrix elements P(I, J), P(K, J) and the Fock matrix elements F(I, J), F(K, J) can be stored in the memory in the processor element 2, the numbers of the contracted shells S are divided to divide the job into plural subjobs.

When such a processing method is used, the amount of communication is increased from that in the case where all of the matrix elements can be stored in the memory in the processor element 2 only by an incremental amount which is the number of pieces of additional information associated with the communication protocol attributable to the transmission and reception of the divided density matrix elements and Fock matrix elements.

The RT parallel algorithm according to the embodiment can accommodate a case of a very large scale of computation in which not all of the density matrix elements P(I, J(, P(K, J) and the Fock matrix elements F(I, J), F(K, J) and not all of the density matrix elements P(I, L), P(K, L) and the Fock matrix elements F(I, L), F(K, L) can be stored in the memory in the processor element 2. Processing algorithm for such a case will be described below.

Let us assume here that X represents the collective data size of all of P(I, J), P(K, J) and the Fock matrix elements F(I, J), F(K, J) (hereinafter referred to as "matrix information A") and that Y represents the collective data size of all of the density matrix elements P(I, L), P(K, L) and the Fock matrix elements F(I, L), F(K, L) (hereinafter referred to as "matrix information B").

It is also assumed here that and the data amount having a size of $X/x+Y/y$ can be stored in the memory in the processor element 2 where the contracted shell numbers S are divided to divide the matrix information A into equal x parts and the contracted shell numbers U are divided to divide the matrix information B into y equal parts. Now, one job specified by an RT pair has been divided into $x \times y$ subjobs.

Figure 13:
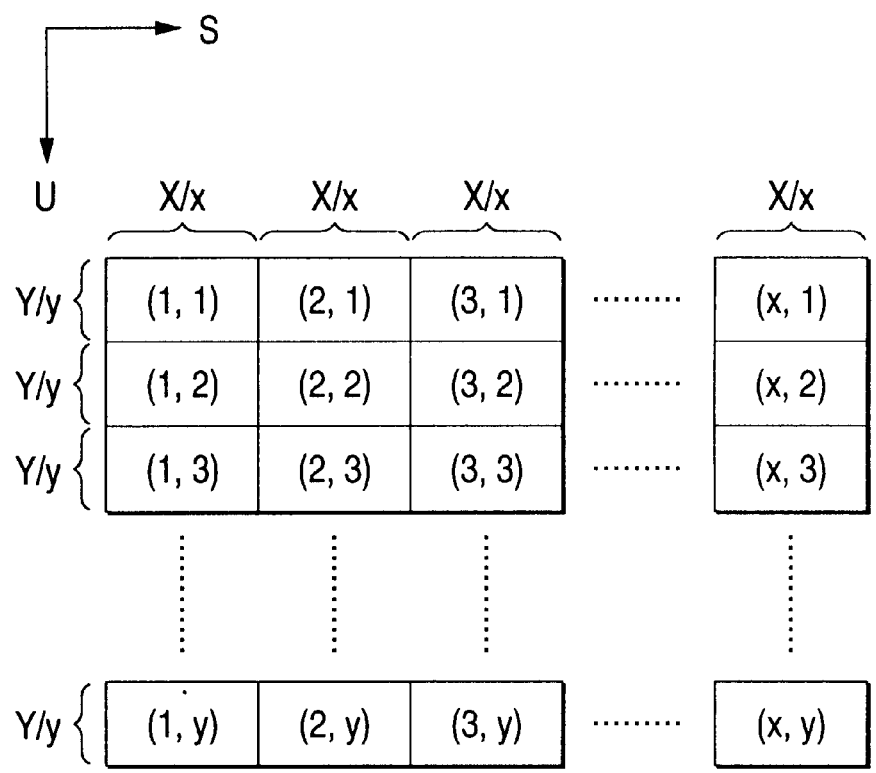
FIG. 13 illustrates an example of a method for dividing a large amount of calculation into subjobs and assigning them to processor elements in the embodiment of the invention.

Let us assume that, as shown in FIG. 13, the numbers of the subjobs are represented in the form of (division number associated with S, division number associated with U); subjob numbers (1, 1) through (1, y) are assigned to a processor element PE1; subjob numbers (2, 1) through (2, y) are assigned to a processor element PE2; and subjob numbers (x, 1) through (x, y) are assigned to a processor element PEx (first dividing method). Then, the amount of data transmitted and received between the host computer and one processor element is $X/x+y \times y/y$.

Since each of the x processor elements performs communication in such a manner, the amount of communication per job specified by an RT pair is $x \times [X/x+y \times Y/y]=X+xY$.

When the subjob numbers (1, 1) through (x, 1) are assigned to the processor element PE1; the subjob numbers (1, 2) through (x, 2) are assigned to the processor element PE2; and the subjob numbers (1, y) through (x, y) are assigned to the processor element PEy conversely to the above example (second dividing method), the amount of communication per job specified by an RT pair is $yX+Y$.

Since the memory in the processor element 2 has a limited capacity, it is preferable to assign subjobs to separate processor elements 2 by comparing X and Y, and dividing S if X<Y or U if X>Y in order to reduce the number of divisions of the contracted shell numbers.

The first and second dividing methods will now be compared in terms of the amount of communication. x is proportionate to X; y is proportionate to Y; and the proportionality factors can be regarded approximately the same. Therefore, the difference in the amount of communication between the first and second dividing methods is X−Y. The second dividing method results in a smaller amount of communication if X>Y, and the first dividing method results in a smaller amount of communication if X<Y.

Specifically, the second dividing method is used when the sum of the numbers of the density matrix elements of P(I, J), P(K, J) and the Fock matrix elements F(I, J), F(K, J) is greater than the sum of the numbers of the density matrix elements P(I, L), P(K, L) and the Fock matrix elements F(I, L), F(K, L) (X>Y). The first dividing method is used when the sum of the numbers of the density matrix elements of P(I, J), P(K, J) and the Fock matrix elements F(I, J), F(K, J) is smaller than the sum of the numbers of the density matrix elements P(I, L), P(K, L) and the Fock matrix elements F(I, L), F(K, L) (X>Y). This makes it possible to suppress the increase in the amount of communication.

Figure 14:
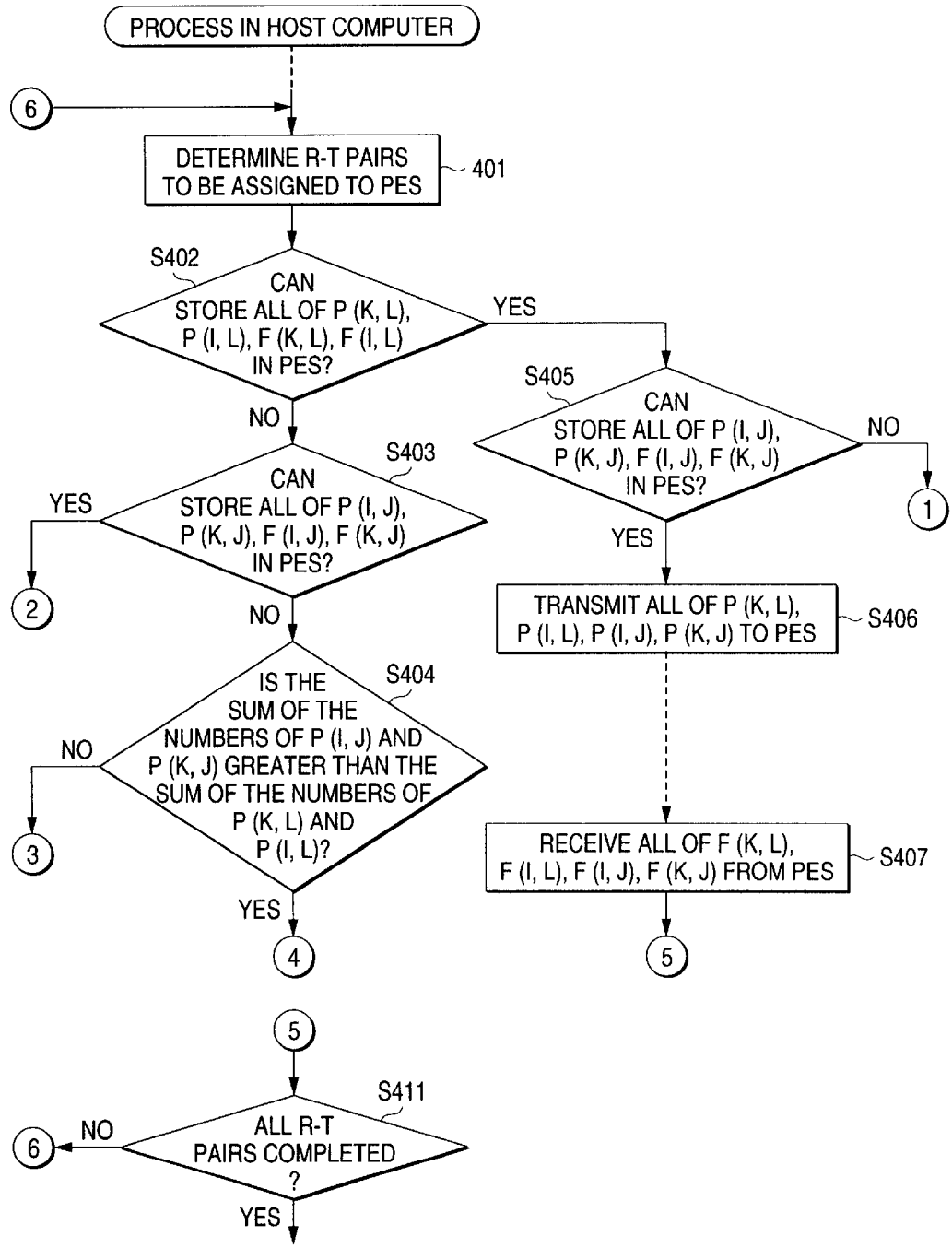
FIG. 14 is a part of a flowchart showing an example of a processing algorithm for the host computer in the case of job dividing in the embodiment of the invention.

FIG. 14 shows algorithm for a process in the host computer in which job division is taken into account. FIG. 14 corresponds to the part from steps S103 to S106 of the processing algorithm of the host computer in FIG. 5, step S401 in FIG. 14 corresponding to step S103 in FIG. 5, step S411 in FIG. 14 corresponding to step S106 in FIG. 5. In FIG. 14, the processor elements are represented by PE for simplicity.

Specifically, an RT pair number to be assigned to the processor element 2 is determined at step S401 in FIG. 14. Thereafter, the host computer 1 first determines whether all of the elements P(K, L), P(I, L), F(K, L) and F(I, L) can be stored in the processor element 2 to which the RT pair number is assigned (step S402).

When it is determined at step S402 that the elements can be stored, another determination is made on whether all of the elements P(I, J), P(K, J), F(I, J) and F(K, J) can be stored in the processor element 2 to which the RT pair number is assigned (step S405). If yes, the process sequentially proceeds to steps S406 and S407. If not, the process shown in FIG. 15 to be described later is performed.

Steps S406 and S407 are similar to the processes in FIG. 5 because they are processes performed when all of the density matrix elements and Fock matrix elements required for a process corresponding to the RT pair number assigned to the processor element 2 can be stored in the memory of the processor element 2. Specifically, all of the elements P(K, L), P(I, L), P(I, J) and F(K, J) are transmitted to the processor element 2 (step S406). Thereafter, the host computer 1 stands by until the process is terminated and it receives all of the elements F(K, L), F(I, L), F(I, J) and F(K, J) from the processor element 2 (step S407).

When it is determined at step S402 that the elements can not be stored, it is determined whether all of the elements P(I, J), P(K, J), F(I, J) and F(K, J) can be stored in the memory in the processor element 2 to which the RT pair number is assigned (step S403). When it is determined that the elements can be stored, the process in FIG. 16 to be described later is performed and, if not, the process proceeds to step S404.

The sum of the numbers of the elements P(I, J) and P(K, J) and the sum of the numbers of the elements P(K, L) and P(I, L) are compared. If the latter is equal to or greater than the former, the process shown in FIG. 17 to be described later is performed and, if the former is greater, the process shown in FIG. 18 to be described later is performed.

When any of the processes in FIGS. 15 through 18 is completed, the post computer 1 determines whether the process has been completed for all RT pairs (step S411) The same process as in FIG. 5 follows.

Figure 15:
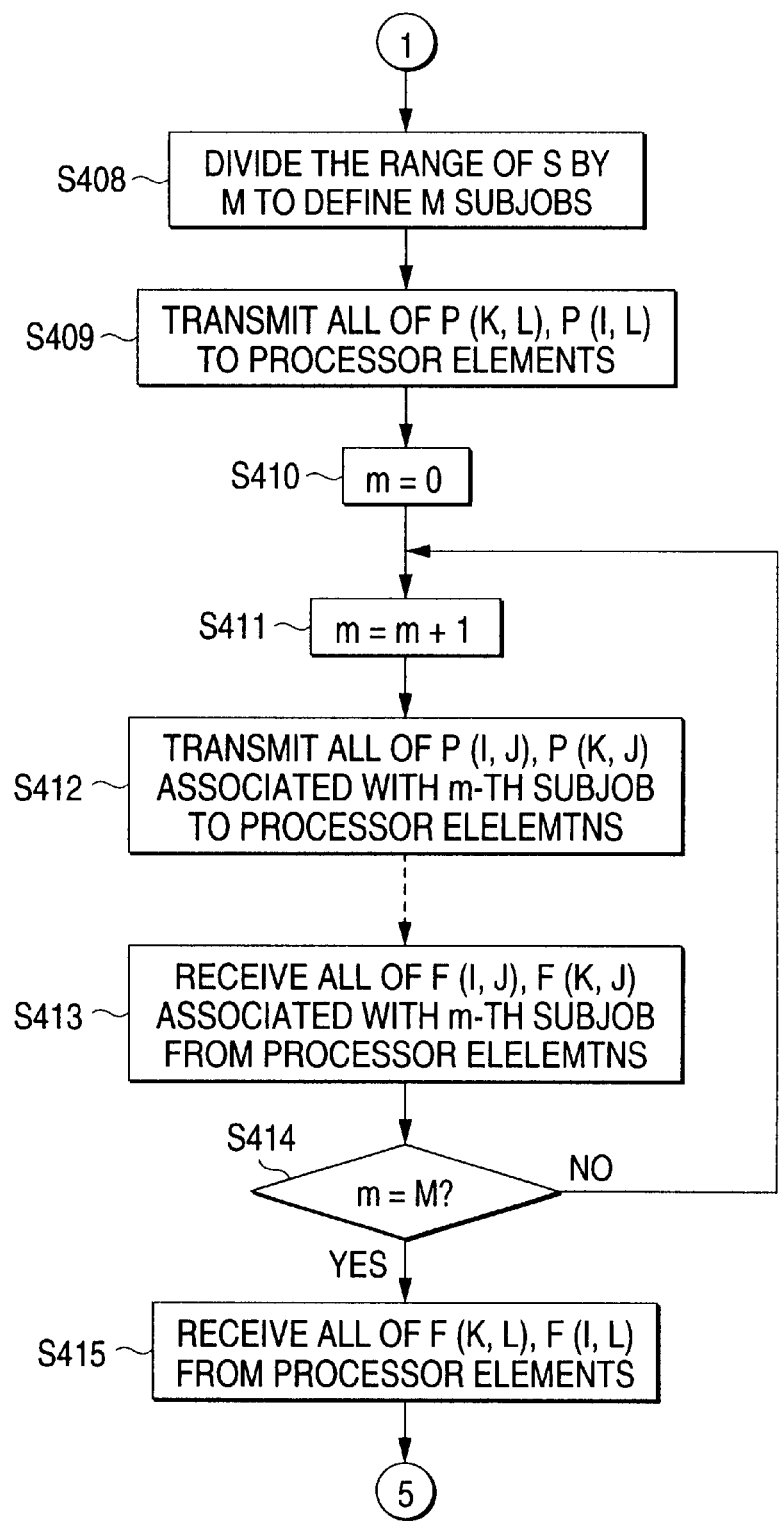
FIG. 15 is another part of the flowchart showing an example of the processing algorithm for the host computer in the case of job dividing in the embodiment of the invention.

The process shown in FIG. 15 will now be described. This is a process performed in a case wherein all of the elements P(K, L), P(I, L), F(K, L) and F(I, L) can be stored in the memory in the processor element 2 although the entire density matrix and Fock matrix required for the process corresponding to the RT pair number assigned to the processor element 2 can not be stored.

First, an estimate is made of the vacant capacity available in the memory of the processor element 2 when all of the elements P(K, L), P(I, L), F(K, L) and F(I, L) are stored, and the range of S is divided by M such that all of the elements P(I, J), P(K, J), F(I, F) and F(K, J) associated therewith are equal to or less than the vacant capacity. At the same time, M subjobs are defined using each of the divisions of S as a unit (step S408).

Next, all of the elements P(K, L) and P(I, L) are transmitted to the processor element 2 (step S409). Thereafter, all of the elements P(I, J), P(I, L) associated with an m-th subjob are transmitted to the processor element 2 and, after a state of waiting the completion of the process, all elements F(I, J) and F(K, J) associated with the m-th subjob are received from the processor element 2, which process is repeated for values of m from 1 through M (steps S410 through S414).

When all of the recursive processes for the values of m from 1 through M, all elements F(K, L) and F(I, L) are received from the processor element (step S415). The process thereafter proceeds to step S411 in FIG. 14.

Figure 16:
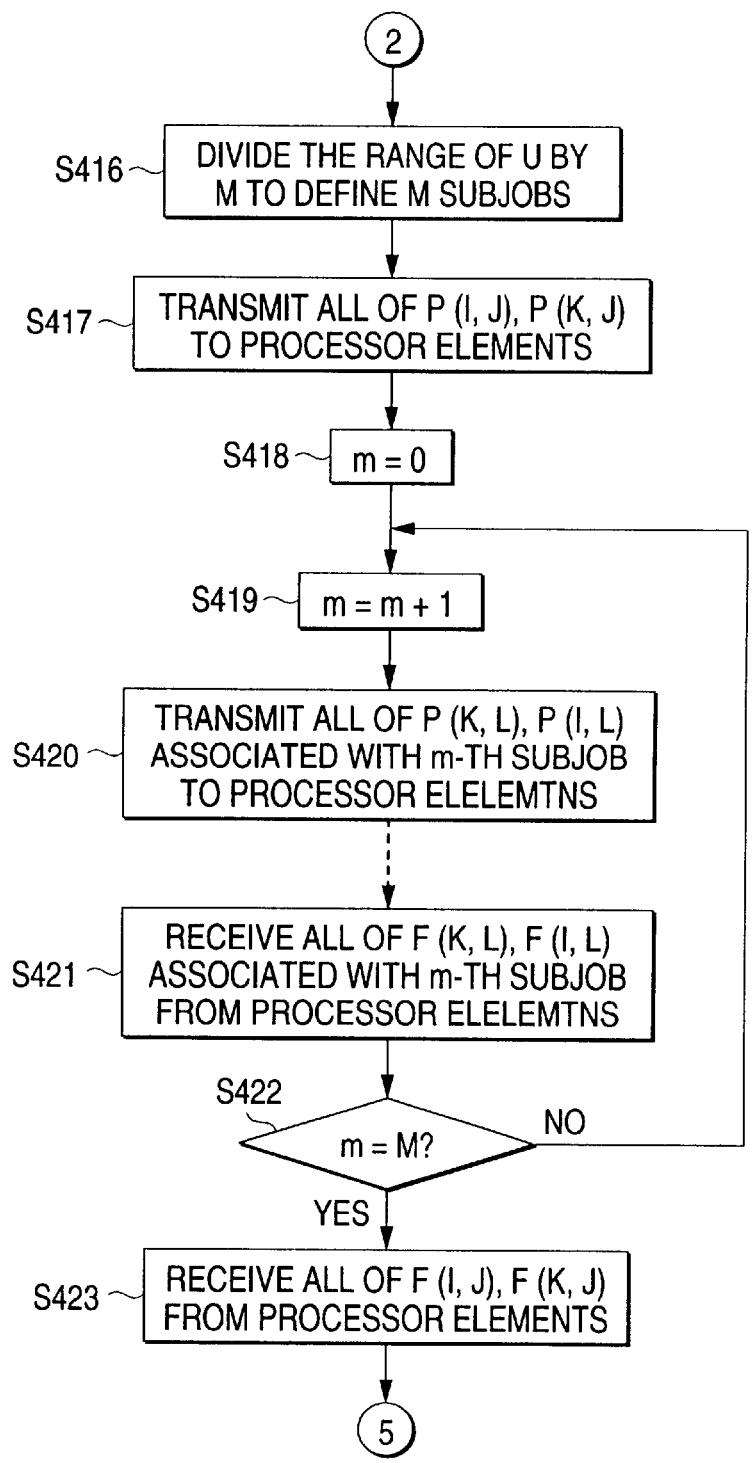
FIG. 16 is another part of the flowchart showing an example of the processing algorithm for the host computer in the case of job dividing in the embodiment of the invention.

The process shown in FIG. 16 will now be described. This is a process performed in a case wherein not all of density matrix elements and Fock matrix elements required for the process associated with an RT pair number assigned to the processor element 2 can be stored in the memory of the processor element 2 and wherein all of the elements P(I, J), P(K, J), F(I, J) and F(K, J) can be stored while not all of the elements P(K, L), P(I, L), F(K, L) and F(I, L) can be stored.

First, an estimate is made of the vacant capacity available in the memory of the processor element 2 when all of the elements P(I, J), P(K, J), F(I, J) and F(K, J) are stored, and the range of U is divided by M such that all of the elements P(K, L), P(I, L), F(K, L) and F(I, L) associated therewith are equal to or less than the vacant capacity. At the same time, M subjobs are defined using each of the divisions of U as a unit (step S414).

Next, all of the elements P(I, J) and P(K, J) are transmitted to the processor element 2 (step S417). Thereafter, all of the elements P(K, L), P(I, L) associated with an m-th subjob are transmitted to the processor element 2 and, after a state of waiting the completion of the process, all elements F(K, L) and F(I, L) associated with the m-th subjob are received from the processor element 2, which process is repeated for values of m from 1 through M (steps S418 through S422).

When all of the recursive processes for the values of m from 1 through M, all elements F(I, J) and F(K, J) are received from the processor element (step S423). The process thereafter proceeds to step S411 in FIG. 14.

Figure 17:
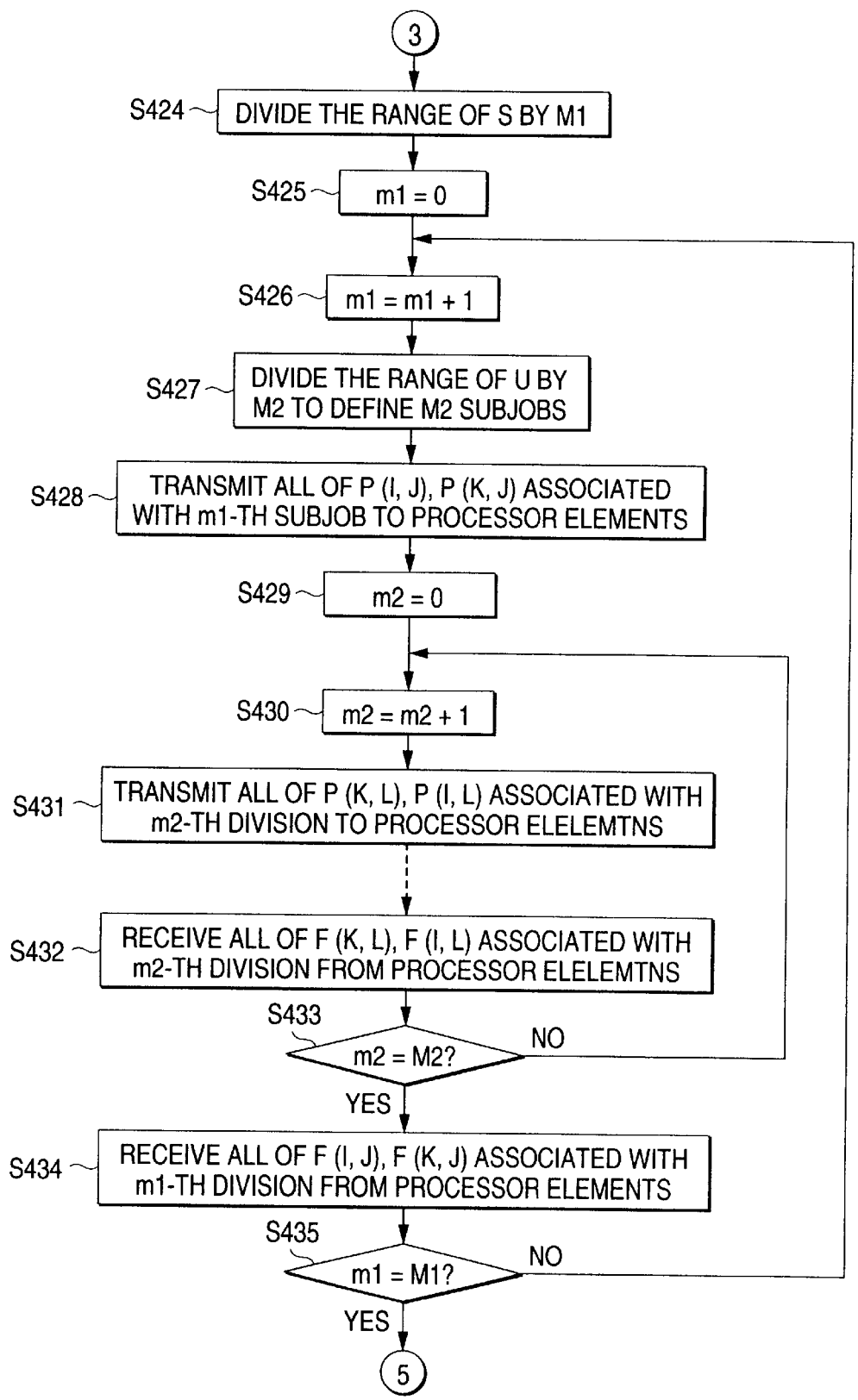
FIG. 17 is another part of the flowchart showing an example of the processing algorithm for the host computer in the case of job dividing in the embodiment of the invention.

The process shown in FIG. 17 will now be described. This is a process performed in a case wherein not all of the elements P(K, L), P(I, L), F(K, L) and F(I, L) can be stored in the memory of the processor element 2; not all of the elements P(I, J), P(K, J), F(I, J) and F(K, J) can be stored also; and the sum of the numbers of the elements P(I, J) and P(K, J) is not greater than the sum of the numbers of the elements P(K, L) and P(I, L).

First, the range of S is divided by M such that all of the elements P(I, J), P(K, J), F(I, J) and F(K, J) are equal to or less than the vacant space of the memory. M1 is set at the smallest possible value.

Next, after m1 is initialized to 0 at step S425, the process proceeds to step S426 and later steps to execute a loop associated with m1 for values of m1 in the range from 0 to M1. In the loop associated with m1, an estimate is first made of the vacant capacity available in the memory of the processor element 2 when all of the divided elements P(I, J), P(K, J), F(I, J) and F(K, J) are stored, and the range of U is divided by M2 such that all of the elements P(K, L), P(I, L), F(K, L) and F(I, L) associated therewith are equal to or less than the vacant capacity. Further, M2 subjobs are defined using each of the divisions of U as a unit (step S427). Next, all of the elements P(I, J) and P(K, J) associated with an m1-th division are transmitted to the processor element 2 (step S428).

Thereafter, after m2 is initialized to 0 at step S429, the process proceeds to step S430 and later steps to execute a loop associated with m2 for values of m2 in the range from 0 to M2. In the loop associated with m2, first, all of the elements P(K, L) and P(I, L) associated with an m2-th division are transmitted to the processor element (step S432) and, after a state of waiting the completion of the process, all of the elements F(K, L) and F(I, L) associated with the m2-th division are received from the processor element (step S432).

When it is determined that the loop associated with m2 is terminated (step S433), all of the elements F(I, J) and F(K, J) associated with the m1-th division are received from the processor element 2 (step S434). When it is then determined that the loop associated with m1 is terminated (step S435), the process proceeds to step S411.

While the process of all subjobs in the loop associated with m1-th division must be performed in the same processor element 2, each of processes associated with the M1 different divisions of S may be regarded as an individual job and may be processed in a different processor element. Those jobs result in the same amount of communication whether they are executed in the same processor element or in different processor elements.

Figure 18:
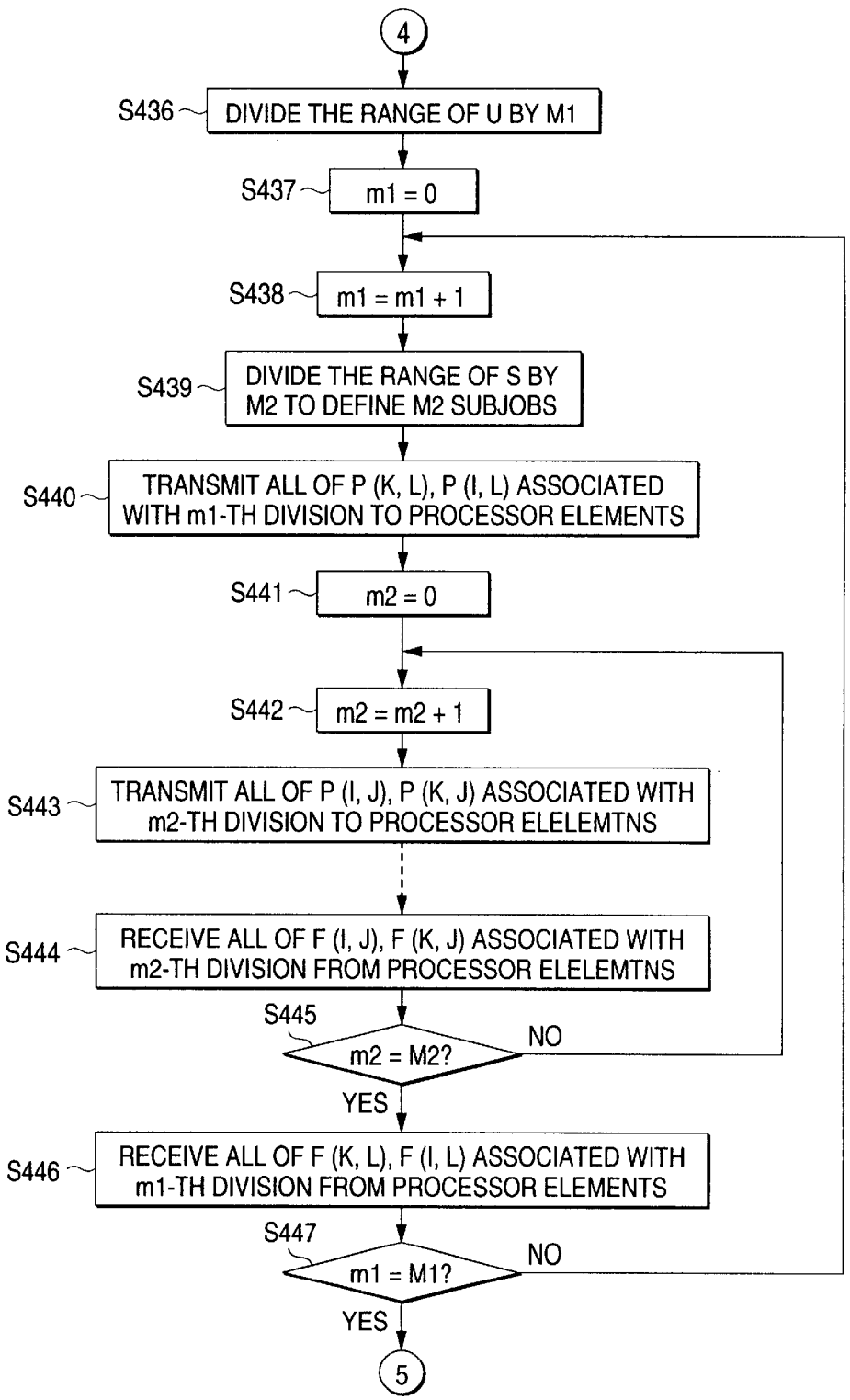
FIG. 18 is another part of the flowchart showing an example of the processing algorithm for the host computer in the case of job dividing in the embodiment of the invention.
Figures 19, 20:
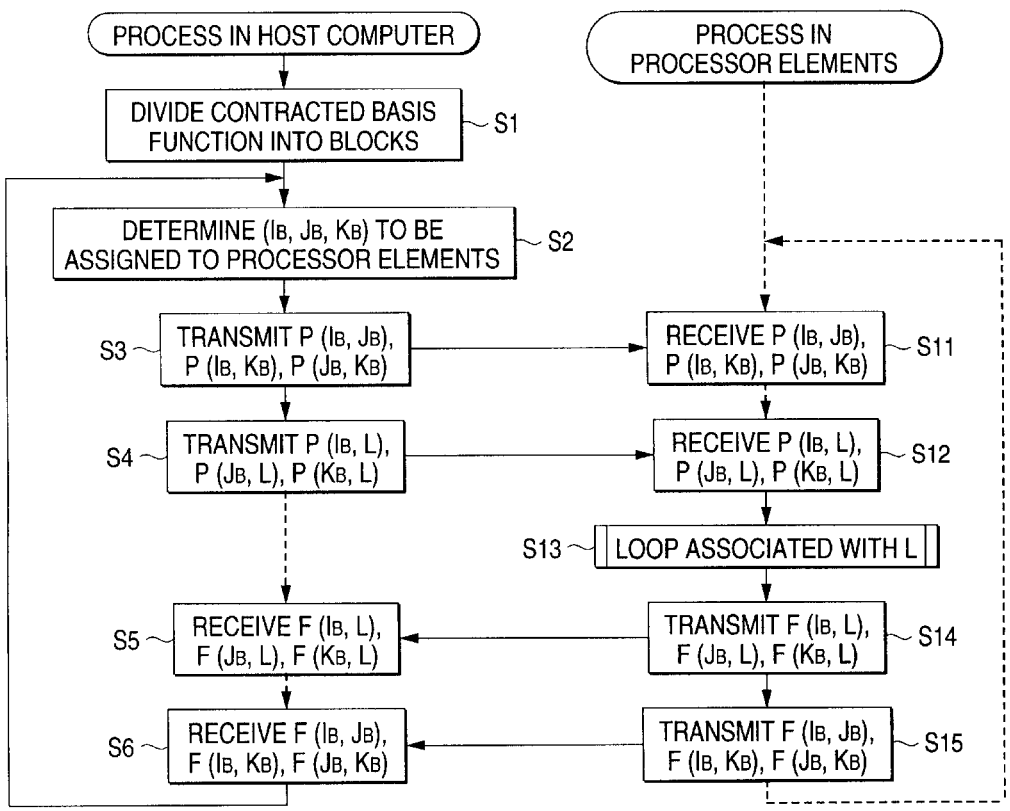
FIG. 19 illustrates an example of correspondence between primitive basis functions and angular momenta, orbital exponents and nuclear coordinates thereof.
FIG. 20 is a flowchart of conventional Foster's row-blocked algorithm.
Figure 21:
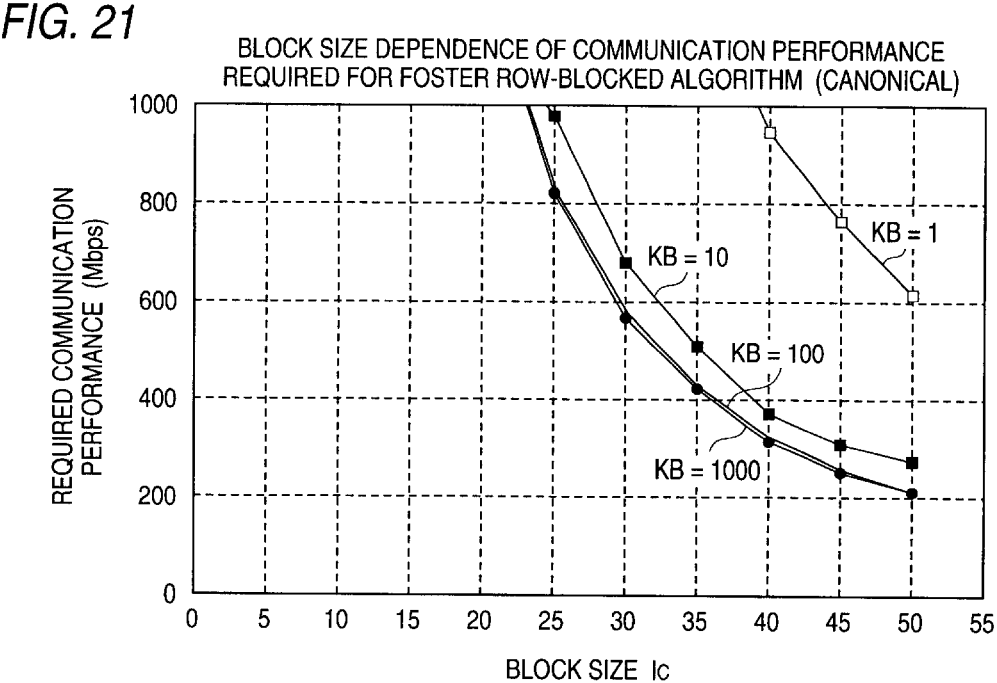
FIG. 21 illustrates the dependence of required communication performance on block sizes in the case of conventional Foster's row-blocked algorithm based on a canonical ordering method.
Figure 22:
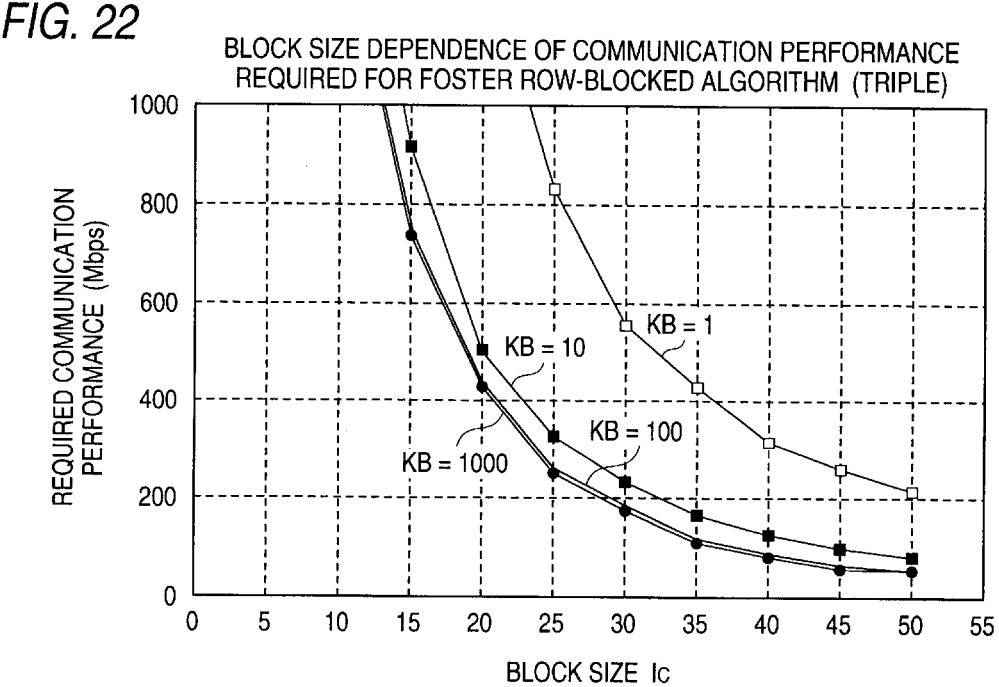
FIG. 22 illustrates the dependence of required communication performance on block sizes in the case of conventional Foster's row-blocked algorithm based on a triple sort method.

The process shown in FIG. 18 will now be described. This is a process performed in a case wherein not all of the elements P(K, L), P(I, L), F(K, L) and F(I, L) can be stored in the memory of the processor element 2; not all of the elements P(I, J), P(K, J), F(I, J) and F(K, J) can be stored also; and the sum of the numbers of the elements P(I, J) and P(K, J) is greater than the sum of the numbers of elements P(K, L) and P(I, L).

First, the range of U is divided by M1 such that all of the elements P(K, L), P(I, L), F(K, L) and F(I, L) are equal to or less than the vacant capacity of the memory. M1 is set at the smallest possible value (step S436). After m1 is initialized to 0 at step S437, the process proceeds to step S438 and later steps to execute a loop associated with m1 for values of m1 in the range from 1 to M1.

In the loop associated with m1, an estimate is first made of the vacant capacity of the memory available when all of the divided elements P(K, L), P(I, L), F(K, L) and F(I, L) are stored, and the range of S is divided by M such that all of the elements P(I, J), P(K, J), F(I, J) and F(K, J) associated therewith are equal to or less than the vacant capacity. Further, M2 subjobs are defined using each of the divisions of S as a unit (step S439).

All of the elements P(K, L) and P(I, L) associated with the m-th division are transmitted to the processor element 2, and step S441 thereafter initializes m2 to 0. Then, the process proceeds to step S442 and later steps to execute a loop associated with M2 for values of m2 in the range from 1 to M2.

In the loop associated with m2, all of the elements P(I, J), P(K, J) associated with the m2-th division are first transmitted to the processor element 2 (step S443) and, after a state of waiting the completion of the process, all of the elements F(I, J) and F(K, J) associated with the m2-th division are received from the processor element 2 (step S444).

When it is determined that the loop associated with m2 is terminated (step S445), all of the elements F(K, L) and F(I, L) associated with the m1-th division are received from the processor element 2 (step S446). When it is then determined that the loop associated with m1 is terminated (step S447), the process proceeds to step S411 shown in FIG. 14.

While the process of all subjobs in the loop associated with m1-th division must be performed in the same processor element 2, each of processes associated with the M1 different divisions of U may be regarded as an individual job and may be processed in a different processor element.

The above-described embodiment is an application of the present invention to high-speed calculation of Fock matrix elements in simulating a molecule using the ab initio molecular orbital method. The present invention is not limited to such ab initio molecular orbital methods and may obviously be applied to various kinds of algorithm for parallel processing.

As described above, the present invention makes it possible to perform calculation of large-scale matrix elements using a parallel processing system having a low-cost communication device and a relatively small memory.

What is claimed is:

1. A method for parallel processing utilizing a parallel processing apparatus having a host computer and at least one processor element to obtain all elements of a Fock matrix F whose elements are a sum F(R, S)=F1(R, S)+F2(R, S) where F1(R, S) is a sum regarding all of variables T and U within a range from 1 to N (N is a positive integer) in product A1·P(T, U)·G(R, S, T, U) of functional values G(R, S, T, U) of a function G satisfying a relationship expressed using four integral type variables R, S, T and U within the same range from 1 to N (N is a positive integer) satisfying a relationship G(R, S, T, U)=G(R, S, U, T)=G(S, R, T, U)=G(S, R, U, T)=G(T, U, R, S)=G(T, U, S, R)=G(U, T, R, S)=G(U, T, S, R), elements P(T, U) of a matrix P satisfying a relationship P(T, U)=P(U, T) and a coefficient A1 and where F2(R, S) is a sum of all of the variables T and U within the range regarding product A2·P(T, U)·G(R, U, T, S) of the functional values G(R, U, T, S), matrix elements P(T, U) and coefficient A2, the method comprising the steps of:

forming a triple loop associated with the variables R, S, T and U;

making the outermost loop of the triple loop associated with combinations of the variables R and T satisfying relationships R≦N and T≦R;

making the second loop inside the outermost loop associated with the variable S while making the third loop inside the second loop associated with the variable U, or alternatively, making the second loop associated with the variable U while making the third loop associated with the variable T;

setting the value of the variable S within the range from 1 to R;

setting the value of the variable U within the range from 1 to R; and calculating a predetermined one among the functional values G(R, S, T, U) inside the third loop and calculating a predetermined part of the matrix elements F using the result of the calculation, wherein the second and third loops are combined to form one job unit, and the at least one processor element performs processing on the basis of the job units.

2. A method for parallel processing in which molecular orbital calculation for calculating the energy of a molecule represented using N (N is a positive integer) contracted shells is carried out using a parallel processing apparatus having a host computer and at least one processor element, by obtaining all matrix elements F(I, J) of a Fock matrix F represented by a sum regarding all primitive basis functions included in contracted basis functions I and J one of whose elements is primitive basis functions i and j respectively included in a sum f(I, J)=f1(I, J)+f2(I, J) where f1(I, J) is a sum regarding all of contracted basis functions in product A1·P(K, L)·g(i, j, k, l) of functional values g(i, j, k, l) of an electron repulsion integral function g represented using primitive basis functions i, j, k and l which are components of respective primitive shells r, s, t and u included in respective contracted shells R, S, T and U as indices, elements P(K, L) of a density matrix P represented using a contracted basis function K one of whose component is the primitive basis function k and a contracted basis function L one of whose component is the primitive basis function l as indices and a coefficient A1 and where f2(I, J) is a sum regarding all contracted basis functions in product A2·P(K, L)·g(i, k, j, l) of functional values g(i, k, j, l) of the electron repulsion integral function, the elements P(K, L) of the density matrix P and a coefficient A2, the obtaining process comprising the steps of:

forming an outermost loop which is a loop associated with combinations of the contracted shells R and T satisfying relationships R≦N and T≦R;

forming a second loop inside the outermost loop as a loop associated with the contracted shell S and a third loop inside the second loop as a loop associated with the contracted shell U or alternatively forming the second loop as a loop associated with the contracted shell U and the third loop as a loop associated with the contracted shell T;

setting the value of the contracted shell S within the range from 1 to R;

setting the value of the contracted shell U within the range from 1 to R; and calculating predetermined one among the electron repulsion integrals inside the third loop and calculating a predetermined part of the Fock matrix elements using the result of the calculation, wherein the second and third loops are combined to form one job unit, and the at least one processor element is assigned a process on the basis of the job units.

3. The parallel processing apparatus including a host computer and at least one processor element, for executing the method for parallel processing according to claim 1, the host computer comprising at least:

means for determining job units in which R and T are fixed to the processor element;

means for selecting a part of the matrix elements of the matrix P to be transmitted to the processor element;

means for transmitting the selected matrix elements to the processor element;

means for receiving a part of the matrix elements of the matrix F transmitted by the processor element; and means for updating the matrix P using the matrix F, the processor element being capable of transmitting and receiving data to and from the host computer, comprising at least:

means for receiving the part of the matrix elements of the matrix P transmitted by the host computer;

means for controlling the loop associated with S;

means for controlling the loop associated with U;

means for calculating the function G(R, S, T, U);

means for calculating a part of the matrix elements of the matrix F;

means for transmitting the part of the matrix elements to the host computer; and data storage means for storing at least:

the part of the matrix elements of the matrix P transmitted by the host computer; and the part of the matrix elements of the matrix F transmitted to the host computer.

4. The parallel processing apparatus including a host computer and at least one processor element, for executing the method for parallel processing according to claim 2, the host computer comprising at least:
   means for determining job units in which R and T are fixed to the processor element;
   means for selecting a part of the matrix elements of the matrix P to be transmitted to the processor element;
   means for transmitting the selected matrix elements to the processor element;
   means for receiving a part of the matrix elements of the matrix F transmitted by the processor element; and
   means for updating the matrix P using the matrix F,
   the processor element being capable of transmitting and receiving data to and from the host computer, comprising at least:
   means for receiving the part of the matrix elements of the matrix P transmitted by the host computer;
   means for controlling the loop associated with S;
   means for controlling the loop associated with U;
   means for calculating the function g(i, j, k, l);
   means for calculating a part of the matrix elements of the matrix F;
   means for transmitting the part of the matrix elements to the host computer; and
   data storage means for storing at least:
   the part of the matrix elements of the matrix P transmitted by the host computer; and
   the part of the matrix elements of the matrix F transmitted to the host computer.

5. The method for parallel processing according to claim 1, including the step of transferring data from the host computer to the processor element before the start of the loop associated with the variable S or the loop associated with the variable U which is located outside, the data comprising:
   all matrix elements P(T, U) to be multiplied with the function G(R, S, T, U) for calculating matrix elements F(R, S) except the matrix elements P(T, U) to be multiplied with the function G(R, S, T, U) which are known not to be calculated by the processor element;
   all matrix elements P(R, S) to be multiplied with the function G(R, S, T, U) for calculating matrix elements F(T, U) except the matrix elements P(R, S) to be multiplied with the function G(R, S, T, U) which are known not to be calculated by the processor element;
   all matrix elements P(T, S) to be multiplied with the function G(R, S, T, U) for calculating matrix elements F(R, U) except the matrix elements P(T, S) to be multiplied with the function G(R, S, T, U) which are known not to be calculated by the processor element; and
   all matrix elements P(R, U) to be multiplied with the function G(R, S, T, U) for calculating matrix elements F(T, S) except the matrix elements P(R, U) to be multiplied with the function G(R, S, T, U) which are known not to be calculated by the processor element.

6. The method for parallel processing according to claim 2, including the step of transferring data from the host computer to the processor element before the start of the loop associated with the index S or the loop associated with the index U which is located outside, the data comprising:
   all matrix elements P(K, L) to be multiplied with the function g(i, j, k, l) for calculating matrix elements F(I, J) except the matrix elements P(K, L) to be multiplied with the function g(i, j, k, l) which are known not to be calculated by the processor element;
   all matrix elements P(I, J) to be multiplied with the function g(i, j, k, l) for calculating matrix elements F(K, L) except the matrix elements P(I, J) to be multiplied with the function g(i, j, k, l) which are known not to be calculated by the processor element;
   all matrix elements P(K, J) to be multiplied with the function g(i, j, k, l) for calculating matrix elements F(I, L) except the matrix elements P(K, J) to be multiplied with the function g(i, j, k, l) which are known not to be calculated by the processor element; and
   all matrix elements P(I, L) to be multiplied with the function g(i, j, k, l) for calculating matrix elements F(K, J) except the matrix elements P(I, L) to be multiplied with the function g(i, j, k, l) which are known not to be calculated by the processor element.

7. The method for parallel processing according to claim 5, wherein the data transferred from the host computer to the processor element comprises at least:
   data representing the variable R and the variable T or data uniquely representing a combination of the variables R and T;
   numerical data of all matrix elements P(T, U) to be multiplied with the function G(R, S, T, U) for calculating matrix elements F(R, S) except the matrix elements P(T, U) to be multiplied with the function G(R, S, T, U) which are known not to be calculated by the processor element;
   numerical data of all matrix elements P(R, S) to be multiplied with the function G(R, S, T, U) for calculating matrix elements F(T, U) except the matrix elements P(R, S) to be multiplied with the function G(R, S, T, U) which are known not to be calculated by the processor element;
   numerical data of all matrix elements P(T, S) to be multiplied with the function G(R, S, T, U) for calculating matrix elements F(R, U) except the matrix elements P(T, S) to be multiplied with the function G(R, S, T, U) which are known not to be calculated by the processor element;
   numerical data of all matrix elements P(T, S) to be multiplied with the function G(R, S, T, U) for calculating matrix elements F(R, U) except the matrix elements P(T, S) to be multiplied with the function G(R, S, T, U) which are known not to be calculated by the processor element;
   data representing the variables U that identify the matrix elements P(T, U) and P(R, U);
   data representing the variables S that identify the matrix elements P(R, S) and P(T, S);
   data representing the number of the variables U; and
   data representing the number of the variables S.

8. The method for parallel processing according to claim 6, wherein the data transferred from the host computer to the processor element comprises at least:
   data representing the index R and the index T or data uniquely representing a combination of the indices R and T;
   numerical data of all matrix elements P(K, L) to be multiplied with the function g(i, j, k, l) for calculating matrix elements F(I, J) except the matrix elements P(K, L) to be multiplied with the function g(i, j, k, l) which are known not to be calculated by the processor element;

numerical data of all matrix elements P(I, J) to be multiplied with the function g(i, j, k, l) for calculating matrix elements F(K, L) except the matrix elements P(I, J) to be multiplied with the function g(i, j, k, l) which are known not to be calculated by the processor element;

numerical data of all matrix elements P(K, J) to be multiplied with the function g(i, j, k, l) for calculating matrix elements F(I, L) except the matrix elements P(K, J) to be multiplied with the function g(i, j, k, l) which are known not to be calculated by the processor element;

numerical data of all matrix elements P(K, J) to be multiplied with the function g(i, j, k, l) for calculating matrix elements F(I, L) except the matrix elements P(K, J) to be multiplied with the function g(i, j, k, l) which are known not to be calculated by the processor element;

data representing the contracted shells U which identify the matrix elements P(K, L) and P(I, L) and whose components are contracted basis functions represented by the index L;

data representing the contracted shells S which identify the matrix elements P(I, J) and P(K, J) and whose components are contracted basis functions represented by the index J;

data representing the number of the contracted shells U; and data representing the number of the contracted shells S.

9. The method for parallel processing according to claim 5, wherein all of matrix elements F(R, S), F(T, U), F(R, U) and F(T, S) calculated by the processor element are transferred from the processor element to the host computer after the completion of the loop associated with S or U which is located outside.

10. The method for parallel processing according to claim 6, wherein all of matrix elements F(I, J), F(K, L), F(I, L) and F(K, J) calculated by the processor element are transferred from the processor element to the host computer after the completion of the loop associated with S or U which is located outside.

11. The method for parallel processing according to claim 7, wherein the data transferred from the processor element to the host computer comprises at least the matrix elements F(R, S), F(T, U), F(R, U) and F(T, S) calculated by the processor element.

12. The method for parallel processing according to claim 8, wherein the data transferred from the processor element to the host computer comprises at least the matrix elements F(I, J), F(K, L), F(I, L) and F(K, J) calculated by the processor element.

13. The method for parallel processing according to claim 7, wherein, in the processor element, the loops associated with the variables S and U are controlled by a process comprising the steps of:

controlling the loop associated with the variables S while sequentially reading the data representing the variables S that identify the matrix elements P(R, S) and P(T, S) from the first number through the number indicated by the data representing the number of the variables S; and controlling the loop associated with the variables U while sequentially reading the data representing the variables U that identify the matrix elements P(T, U) and P(R, U) from the first number through the number indicated by the data representing the number of the variables U.

14. The method for parallel processing according to claim 8, wherein, in the processor element, the loops associated with S and U are controlled by a process comprising the steps of:

controlling the loop associated with S while sequentially reading the data representing the contracted shells S which identify the matrix elements P(I, J) and P(K, J) and whose components are contracted basis functions represented by the index J from the first number through the number indicated by the data representing the number of the contracted shells S; and controlling the loop associated with U while sequentially reading the data representing the contracted shells U which identify the matrix elements P(K, L) and P(I, L) and whose components are contracted basis functions represented by the index L from the first number through the number indicated by the data representing the number of the contracted shells U.

15. The method for parallel processing according to claim 11, wherein, when not all of the matrix elements P(R, S), P(T, U), P(R, U) and P(T, S) and the matrix elements F(R, S), F(T, U), F(R, U) and F(T, S) can be stored in the data storage means provided in the processor element, the host computer performs a process comprising the steps of:

dividing the range of the variables S to divide the job into a plurality of subjobs, if all of the matrix elements P(T, U), P(R, U), F(T, U) and F(R, U) can be stored in the data storage means, such that the matrix elements P(R, S), P(T, S), F(R, S) and F(T, S) can be stored in the data storage means along with all of the matrix elements P(T, U), P(R, U), F(T, U) and F(R, U);

assigning the plurality of divided subjobs to the same processor element;

transmitting the matrix elements P(T, U) and P(R, U) to the processor element only when the first subjob of the plurality of subjobs is started;

receiving the matrix elements F(R, U) and F(R, U) from the processor element only when the last subjob of the plurality of subjobs is completed;

transmitting the matrix elements P(R, S) and P(T, S) to the processor element when each of the plurality of subjobs is started; and receiving the matrix elements F(R, S) and F(T, S) from the processor element when each of the plurality of subjobs is completed, and wherein the host computer performs a process comprising the steps of:

dividing the range of the variables U to divide the job into a plurality of subjobs, if not all of the matrix elements P(R, U) P(T, U), F(R, U) and F(T, U) can be stored in the data storage means and all of the matrix elements P(R, S), P(T, S), F(R, S) and F(T, S) can be stored in the data storage means, such that the matrix elements P(T, U), P(R, U), F(T, U) and F(R, U) can be stored in the data storage means along with all of the matrix elements P(R, S), P(T, S), F(R, S) and F(T, U);

assigning the plurality of divided subjobs to the same processor element;

transmitting the matrix elements P(R, S) and P(T, S) to the processor element only when the first subjob of the plurality of subjobs is started;

receiving the matrix elements F(R, S) and F(T, S) from the processor element only when the last subjob of the plurality of subjobs is completed;

transmitting the matrix elements P(T, U) and P(R, U) to the processor element when each of the plurality of subjobs is started; and receiving the matrix elements F(T, U) and F(R, U) from the processor element when each of the plurality of subjobs is completed.

16. The method for parallel processing according to claim 12, wherein, when not all of the matrix elements P(I, J), P(K, L), P(I, L) and P(K, J) and the matrix elements F(I, J), F(K, L), F(I, L) and F(K, J) can be stored in the data storage means provided in the processor element, the host computer performs a process comprising the steps of:

dividing the range of the contracted shells S to divide the job into a plurality of subjobs, if all of the matrix elements P(K, L), P(I, L), F(K, L) and F(I, L) can be stored in the data storage means, such that the matrix elements P(I, J), P(K, J), F(I, J) and F(K, J) can be stored in the data storage means along with all of the matrix elements P(K, L), P(I, L), F(K, L) and F(I, L);

assigning the plurality of divided subjobs to the same processor element;

transmitting the matrix elements P(K, L) and P(I, L) to the processor element only when the first subjob of the plurality of subjobs is started;

receiving the matrix elements F(K, L) and F(I, L) from the processor element only when the last subjob of the plurality of subjobs is completed;

transmitting the matrix elements P(I, J) and P(K, J) to the processor element when each of the plurality of subjobs is started; and receiving the matrix elements F(I, J) and F(K, J) from the processor element when each of the plurality of subjobs is completed, and wherein the host computer performs a process comprising the steps of:

dividing the range of the contracted shells U to divide the job into a plurality of subjobs, if not all of the matrix elements P(I, L), P(K, L), F(I, L) and F(K, L) can be stored in the data storage means and all of the matrix elements P(I, J), P(K, J), F(I, J) and F(K, J) can be stored in the data storage means, such that the matrix elements P(K, L), P(I, L), F(K, L) and F(I, L) can be stored in the data storage means along with all of the matrix elements P(I, J), P(K, J), F(I, J) and F(K, J);

assigning the plurality of divided subjobs to the same processor element;

transmitting the matrix elements P(I, J) and P(K, J) to the processor element only when the first subjob of the plurality of subjobs is started;

receiving the matrix elements F(I, J) and F(K, J) from the processor element only when the last subjob of the plurality of subjobs is completed;

transmitting the matrix elements P(K, L) and P(I, L) to the processor element when each of the plurality of subjobs is started; and receiving the matrix elements F(K, L) and F(I, L) from the processor element when each of the plurality of subjobs is completed.

17. The method for parallel processing according to claim 11, wherein, when not all of the matrix elements P(R, S), P(T, U), P(R, U) and P(T, S) and the matrix elements F(R, S), F(T, U), F(R, U) and F(T, S) can be stored in the data storage means provided in the processor element, the host computer performs a process comprising the steps of:

equally dividing the range of the variables U, if the sum of the numbers of the matrix elements P(R, S) and the matrix elements P(T, S) is greater than the sum of the numbers of the matrix elements P(R, U) and the matrix elements P(T, U) and not all of the matrix elements P(T, U), P(R, U), F(T, U) and F(R, U) can be stored in the data storage means, such that the matrix elements P(T, U), P(R, U), F(T, U) and F(R, U) can be stored in the data storage means;

dividing the range of the variables S to divide the job into a plurality of subjobs such that the matrix elements P(R, S), P(T, S), F(R, S) and F(T, S) can be stored in the storage means along with the equally divided matrix elements P(T, U), P(R, U), F(T, U) and F(R, U);

assigning the plurality of divided subjobs to the same processor element;

transmitting the matrix elements P(T, U) and P(R, U) to the processor element only when the first subjob of the plurality of subjobs is started;

receiving the matrix elements F(R, U) and F(R, U) from the processor element only when the last subjob of the plurality of subjobs is completed;

transmitting the matrix elements P(R, S) and P(T, S) to the processor element when each of the plurality of subjobs is started; and receiving the matrix elements F(R, S) and F(T, S) from the processor element when each of the plurality of subjobs is completed, and wherein the host computer performs a process comprising the steps of:

equally dividing the range of the variables S, if the sum of the numbers of the matrix elements P(R, S) and the matrix elements P(T, S) is smaller than or equal to the sum of the numbers of the matrix elements P(R, U) and the matrix elements P(T, U) and not all of the matrix elements P(R, S), P(T, S), F(R, S) and F(T, S) can be stored in the data storage means, such that the matrix elements P(R, S), P(T, S), F(R, S) and F(T, S) can be stored in the data storage means;

dividing the range of the variables U to divide the job into a plurality of subjobs such that the matrix elements P(T, U), P(R, U), F(T, U) and F(R, U) can be stored in the data storage means along with the equally divided matrix elements P(R, S), P(T, S), F(R, S) and F(T, S);

assigning the plurality of divided subjobs to the same processor element;

transmitting the matrix elements P(R, S) and P(T, S) to the processor element only when the first subjob of the plurality of subjobs is started;

receiving the matrix elements F(R, S) and F(T, S) from the processor element only when the last subjob of the plurality of subjobs is completed;

transmitting the matrix elements P(T, U) and P(R, U) to the processor element when each of the plurality of subjobs is started; and receiving the matrix elements F(T, U) and F(R, U) from the processor element when each of the plurality of subjobs is completed.

18. The method for parallel processing according to claim 12, wherein, when not all of the matrix elements P(I, J), P(K, L), P(I, L) and P(K, J) and the matrix elements F(I, J), F(K, L), F(I, L) and F(K, J) can be stored in the data storage means provided in the processor element, the host computer performs a process comprising the steps of:

equally dividing the range of the contracted shells U, if the sum of the numbers of the matrix elements P(I, J)

and the matrix elements P(K, J) is greater than the sum of the numbers of the matrix elements P(I, L) and the matrix elements P(K, L) and not all of the matrix elements P(K, L), P(I, L), F(K, L) and F(I, L) can be stored in the data storage means, such that the matrix elements P(K, L), P(I, L), F(K, L) and F(I, L) can be stored in the data storage means;

dividing the range of the contracted shells S to divide the job into a plurality of subjobs such that the matrix elements P(I, J), P(K, J), F(I, J) and F(K, J) can be stored in the data storage means along with the equally divided matrix elements P(K, L), P(I, L), F(K, L) and F(I, L);

assigning the plurality of divided subjobs to the same processor element;

transmitting the matrix elements P(K, L) and P(I, L) to the processor element only when the first subjob of the plurality of subjobs is started;

receiving the matrix elements F(K, L) and F(I, L) from the processor element only when the last subjob of the plurality of subjobs is completed;

transmitting the matrix elements P(I, J) and P(K, J) to the processor element when each of the plurality of subjobs is started; and receiving the matrix elements F(I, J) and F(K, J) from the processor element when each of the plurality of subjobs is completed, and wherein the host computer performs a process comprising the steps of:

equally dividing the range of the contracted shells S, if the sum of the numbers of the matrix elements P(I, J) and the matrix elements P(K, J) is smaller than or equal to the sum of the numbers of the matrix elements P(I, L) and the matrix elements P(K, L) and not all of the matrix elements P(I, J), P(K, J), F(I, J) and F(K, J) can be stored in the data storage means, such that the matrix elements P(I, J), P(K, J), F(I, J) and F(K, J) can be stored in the data storage means;

dividing the range of the contracted shells U to divide the job into a plurality of subjobs such that the matrix elements P(K, L), P(I, L), F(K, L) and F(I, L) can be stored in the data storage means along with all of the matrix elements P(I, J), P(K, J), F(I, J) and F(K, J);

assigning the plurality of divided subjobs to the same processor element;

transmitting the matrix elements P(I, J) and P(K, J) to the processor element only when the first subjob of the plurality of subjobs is started;

receiving the matrix elements F(I, J) and F(K, J) from the processor element only when the last subjob of the plurality of subjobs is completed;

transmitting the matrix elements P(K, L) and P(I, L) to the processor element when each of the plurality of subjobs is started; and receiving the matrix elements F(K, L) and F(I, L) from the processor element when each of the plurality of subjobs is completed.

* * * * *